United States Patent
Lamba et al.

(10) Patent No.: US 8,185,128 B2
(45) Date of Patent: May 22, 2012

(54) METHOD AND APPARATUS FOR SUPPORTING LOCATION SERVICES WITH ROAMING

(75) Inventors: Gaurav Lamba, Sunnyvale, CA (US); Kirk Allan Burroughs, Alamo, CA (US); Ie-Hong Lin, Fremont, CA (US); Sanjeev Khushu, San Diego, CA (US); Zhimin Du, Beijing (CN); Yufei Wang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 823 days.

(21) Appl. No.: 11/564,680

(22) Filed: Nov. 29, 2006

(65) Prior Publication Data

US 2007/0149213 A1 Jun. 28, 2007

Related U.S. Application Data

(60) Provisional application No. 60/741,324, filed on Nov. 30, 2005.

(51) Int. Cl.
*G01C 21/30* (2006.01)
(52) U.S. Cl. ..................... 455/456.1; 701/207
(58) Field of Classification Search ............... 455/456.1, 455/440, 435.1, 404.2, 418, 411, 433; 701/207
See application file for complete search history.

(56) References Cited

U.S. PATENT DOCUMENTS

2001/0003093 A1* 6/2001 Lundin .......................... 455/456
2004/0242238 A1* 12/2004 Wang et al. ................. 455/456.1
2005/0078652 A1* 4/2005 Rousseau et al. ............. 370/349
(Continued)

FOREIGN PATENT DOCUMENTS

JP 2006521767 9/2006
(Continued)

OTHER PUBLICATIONS

Qualcomm Inc.: "Location-Based Services V2 Roaming Support (Nonproprietary)", pp. 1-56, XP002457174 (Jan. 27, 2005), Retrieved from the Internet: URL:http://www.cgd.org/members_only/teams/GHRC/docs/in_dev/location_based/80-V8470-2NP_A,pdf. [retrieved on Oct. 25, 2007].

(Continued)

*Primary Examiner* — George Eng
*Assistant Examiner* — Nizar Sivji
(74) *Attorney, Agent, or Firm* — Andrea Mays; Mary A. Fales

(57) ABSTRACT

Techniques for supporting location services with roaming are described. A mobile station interacts with a home mobile positioning center (H-MPC) in a home network for location services even when roaming. The mobile station communicates with a visited network for a data session and receives a request for its location. The mobile station sends first information (e.g., SID and NID) indicative of its current network location to the H-MPC. The H-MPC determines a serving mobile positioning center (S-MPC) in the visited network based on the first information. The S-MPC determines a serving position determining entity (S-PDE) in the visited network based on the first information. Depending on the selected positioning method, the H-MPC may receive an S-PDE address or a position estimate of the mobile station from the S-MPC and may forward this information to mobile station. The mobile station may communicate with the S-PDE for positioning using the S-PDE address.

51 Claims, 23 Drawing Sheets

MS-resident single fix with gpsOne positioning

U.S. PATENT DOCUMENTS

| | | | |
|---|---|---|---|
| 2005/0125439 A1 | 6/2005 | Nourbakhsh et al. | |
| 2005/0125493 A1* | 6/2005 | Chaskar et al. | 709/203 |
| 2005/0250516 A1* | 11/2005 | Shim | 455/456.1 |
| 2006/0058042 A1* | 3/2006 | Shim | 455/456.3 |
| 2006/0247937 A1* | 11/2006 | Binding et al. | 705/1 |

FOREIGN PATENT DOCUMENTS

| | | |
|---|---|---|
| RU | 2237381 | 9/2004 |
| WO | 2004080096 | 9/2004 |
| WO | 2005051033 | 6/2005 |

OTHER PUBLICATIONS

Qualcomm Inc.: "Location-Based Services System Specifiction Rev. C", pp. 2-56, XP002322287, Announcement Qualcomm CDMA Technologies, Qualcomm, San Diego, CA, US (Jul. 2003).

"Digitial Cellular Telecommunications Sysem (Phase 2+)" ETSI Standards, European Telecommunications Standards Institute, pp. 1-77, vol. 3-SA2, No. V550, Sophia-Antipo, FR, XP014007893 (Dec. 2002).

Qualcomm Inc.: "gpsOne User Plane MS-MPC (Nonproprietary) Protocol Specification," pp. 1-43, 80-V5456-2NP-C (Jan. 5, 2005).

Qualcomm Inc,: "Mobile Positioning Center (MPC) V2 (Nonproprietary) Protocol Specification," pp. 1-26, 80-V6195-2NP-B (Jan. 21, 2005).

Qualcomm Inc,: "gpsOne UserPland E5' V2 Protocol Specificatoin," pp. 1-33, 80-V5458-2NP (Dec. 13, 2004).

TIA/EIA/IS-801, "Position Determination Service Standards for Dual Mode Spread Spectrum Systems," pp. 1-150 (Mar. 2001).

International Search Report, PCT/US2006/061441—International Search Authority—European Patent Office—Nov. 14, 2007.

International Report on Patentability, PCT/US2006/061441—The International Bureau of WIPO—Geneva, Switzerland—Jun. 3, 2008.

Written Opinion, PCT/US2006/061441—International Search Authority—European Patent Office—Nov. 14, 2007.

Location-Based Services V2 Roaming Support (Nonproptietary) 80-V870-2NP A, Jan. 27, 2005, pp. 1-56, [Retrieced on Aug. 3, 2009], XP002457174. Retrived From the Internet: <URL:http//www.cdg.ord/members_only/teams/ghrc/docs/in_dev/location_based/80-V8470-2NP_A.pdf>.

Taiwanese Search report—095144564—TIPO—Oct. 4, 2010.

Translation of Office Action in Japanese application 2008-543584 corresponding to U.S. Appl. No. 11/564,680, citing QUALCOMM_Incorporated_et_al_pgs_11_32_year_2005 and WO2004080096. Dated Nov. 30, 2010.

* cited by examiner

Network-initiated single fix with cell/sector positioning

Network-initiated positioning session rejected by mobile station

MS-resident single fix with gpsOne positioning

MS-resident single fix with cell/sector positioning

METHOD AND APPARATUS FOR SUPPORTING LOCATION SERVICES WITH ROAMING

The present application claims priority to provisional U.S. application Ser. No. 60/741,324, filed Nov. 30, 2005, assigned to the assignee hereof and incorporated herein by reference.

BACKGROUND

1. Field

The present disclosure relates generally to communication, and more specifically to techniques for supporting location services.

2. Background

It is often desirable, and sometimes necessary, to know the location of a mobile station, e.g., a cellular phone. The terms "location" and "position" are synonymous and are used interchangeably. For example, a user may utilize the mobile station to browse through a website and may click on location sensitive content. The location of the mobile station may then be determined and used to provide appropriate content to the user. There are many other scenarios in which knowledge of the location of the mobile station is useful or necessary.

The mobile station may be provisioned such that it can obtain location services from a home network with which the user has a service subscription. The mobile station may communicate with various network entities in the home network in order to determine the location of the mobile station whenever needed. The mobile station may roam to other networks with which the user has no service subscription. A major challenge is to provide location services to the mobile station in such roaming scenario.

SUMMARY

Techniques for supporting location services (LCS) with roaming are described herein. In an aspect, a mobile station interacts with a home mobile positioning center (H-MPC) in a home network for location services even when the mobile station is roaming. The mobile station may communicate with a visited network for a data session and receive a request for the location of the mobile station, e.g., from an application resident on the mobile station (an MS-resident application), an LCS client, or the H-MPC. The mobile station may then send first information to the H-MPC. The first information may indicate the current network location of the mobile station and may be dependent on the radio technology used by the visited network. For example, the first information may comprise a system identifier (SID) and a network identifier (NID) of the visited network or some other information obtained from the visited network. A serving position determining entity (S-PDE) in the visited network may be determined based on the first information. Depending on the selected positioning method, the mobile station may receive from the H-MPC (a) an address of the S-PDE and may then communicate with the S-PDE for positioning of the mobile station or (b) a position estimate of the mobile station, which may be determined by the S-PDE based on the first information.

In another aspect, the H-MPC may receive a request for the location of the mobile station (e.g., from the MS-resident application or the LCS client), receive the first information from the mobile station, and determine a serving mobile positioning center (S-MPC) in the visited network based on the first information. The H-MPC may then receive second information from the S-MPC and send the second information to the mobile station. Depending on the selected positioning method, the second information may comprise the S-PDE address or the position estimate. The H-MPC may also perform other functions such as authorization, handoff, etc.

In yet another aspect, the mobile station may receive a request for the location of the mobile station and may send a query for an address of an S-PDE to a domain name system (DNS) server. The mobile station may include a domain name formed based on the SID and NID in the query sent to the DNS server. The mobile station may receive the address of the S-PDE from the DNS server and may then communicate with the S-PDE for positioning of the mobile station.

Various aspects and features of the disclosure are described in further detail below.

DETAILED DESCRIPTION

The techniques described herein may be used for various wireless networks such as Code Division Multiple Access (CDMA) networks, Time Division Multiple Access (TDMA) networks, Frequency Division Multiple Access (FDMA) networks, Orthogonal FDMA (OFDMA) networks, etc. A CDMA network may implement a radio technology such as cdma2000, Wideband-CDMA (W-CDMA), etc. cdma2000 covers IS-2000, IS-856, and IS-95 standards. A TDMA network may implement a radio technology such as Global System for Mobile Communications (GSM), Digital Advanced Mobile Phone System (D-AMPS), etc. W-CDMA and GSM are described in documents from an organization named "3rd Generation Partnership Project" (3GPP). cdma2000 is described in documents from an organization named "3rd Generation Partnership Project 2" (3GPP2). 3GPP and 3GPP2 documents are publicly available. For clarity, the techniques are described below for 3GPP2 networks.

Figure 1:
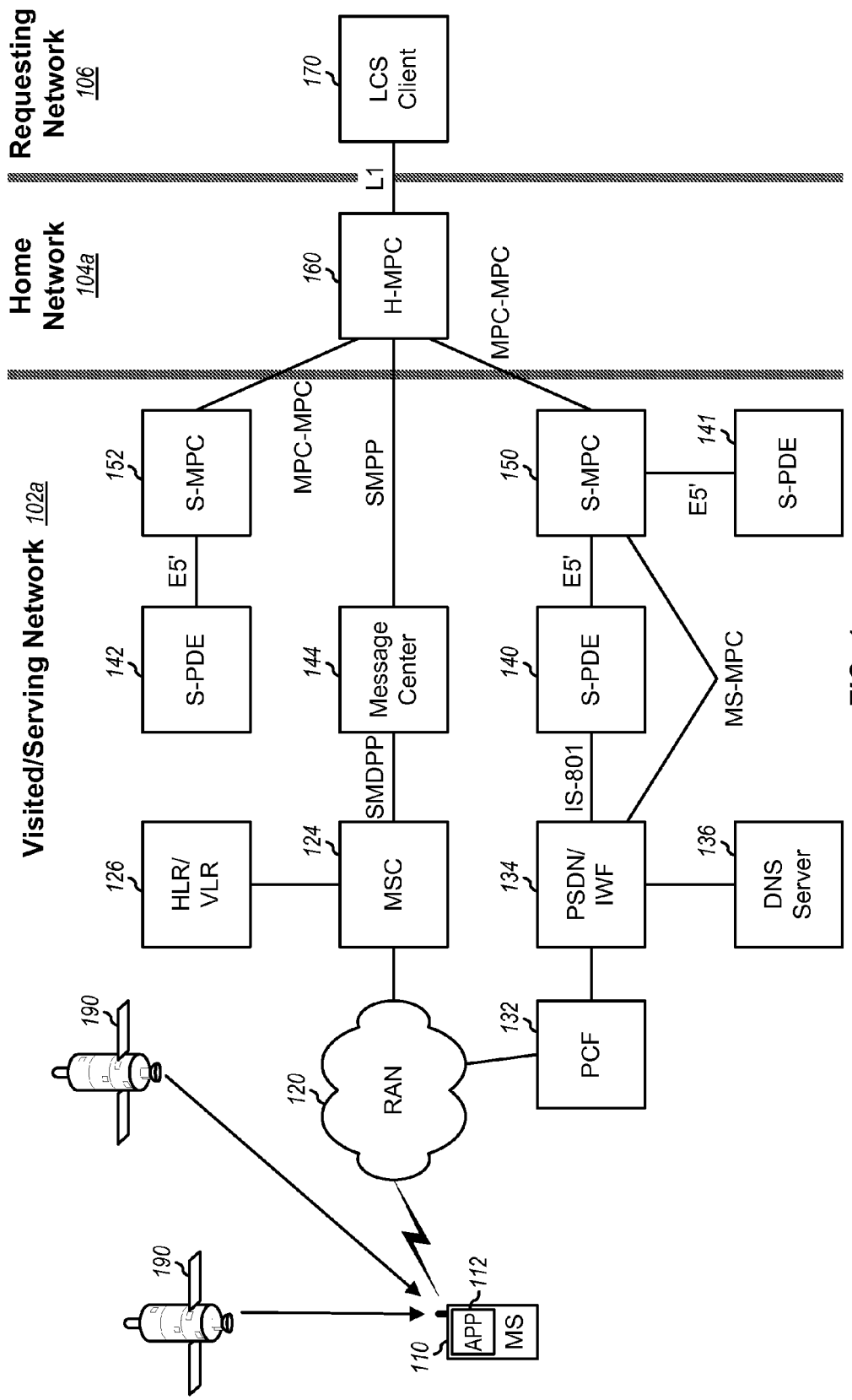
FIG. 1 shows a visited network, a home network, and a requesting network.

FIG. 1 shows a deployment with a visited/serving network 102*a*, a home network 104*a*, and a requesting network 106. The terms "visited" and "serving" are used interchangeably herein. Home network 104*a* is a wireless network with which a mobile station (MS) 110 has a service subscription. Visited network 102*a* is a wireless network currently serving mobile station 110. The visited network and home network may be different networks if mobile station 110 is roaming outside the coverage of the home network. Networks 102*a* and 104*a* support location services (LCS), which may include any services based on or related to location information. LCS may also be referred to as location-based services (LBS), etc. Requesting network 106 may be part of visited network 102*a* or home network 104*a* or may be separate from these networks. For example, requesting network 106 may be a data network maintained by an Internet service provider (ISP).

Mobile station 110 may be stationary or mobile and may also be called a user equipment (UE), a terminal, a subscriber unit, a station, etc. Mobile station 110 may be a cellular phone, a personal digital assistant (PDA), a wireless device, a handset, a laptop computer, a telemetry device, a tracking device, etc. Mobile station 110 may communicate with a radio access network (RAN) 120 in visited network 102*a* to obtain communication services such as voice, video, packet data, broadcast, messaging, etc. Mobile station 110 may also receive signals from one or more satellites 190, which may be part of the United States Global Positioning System (GPS), the European Galileo system, the Russian Glonass system, or some other satellite positioning system. Mobile station 110 may measure signals from satellites 190 and/or signals from base stations in RAN 120 and may obtain pseudo-range measurements for the satellites and/or timing measurements for the base stations. The pseudo-range measurements and/or timing measurements may be used to derive a position estimate of mobile station 110 using one or a combination of positioning methods such as assisted GPS (A-GPS), standalone GPS, Advanced Forward Link Trilateration (A-FLT), Enhanced Observed Time Difference (E-OTD), Observed Time Difference Of Arrival (OTDOA), Enhanced Cell ID, Cell ID, etc.

RAN 120 provides radio communication for mobile stations located within the coverage of the RAN. RAN 120 may include base stations, base station controllers (BSCs), and/or other network entities that support radio communication. A mobile switching center (MSC) 124 supports circuit-switched calls and also routes Short Message Service (SMS) messages. A message center (MC) 144 supports SMS and is responsible for storing, relaying, and forwarding SMS messages for mobile stations. A packet control function (PCF) 132 supports packet data exchanges between RAN 120 and a packet data serving node (PDSN) 134. PDSN 134 supports packet-switched calls for mobile stations and is responsible for the establishment, maintenance, and termination of data sessions. An inter-working function (IWF) may be used in place of PDSN 134 in some wireless networks, e.g., IS-95 networks.

Serving position determining entities (S-PDEs) 140, 141 and 142 support positioning for mobile stations and may serve different geographic areas. Positioning refers to a process to measure/compute a geographic position estimate of a target device. A position estimate may also be referred to as a location estimate, a position fix, a fix, etc. S-PDEs 140, 141 and 142 may exchange messages with mobile stations for positioning, calculating position estimates, supporting delivery of assistance data to the mobile stations, performing functions for security, etc. Serving mobile positioning centers (S-MPCs) 150 and 152 perform various functions for location services and may serve different geographic areas. S-MPCs 150 and 152 may support subscriber privacy, authorization, authentication, roaming support, charging/billing, service management, position calculation, etc. Mobile station 110 may be served by S-MPC 150 and S-PDE 140 initially and may thereafter be handed off to S-PDE 141 or to S-MPC 152 and S-PDE 142 when roaming. A home MPC (H-MPC) 160 in home network 104*a* supports location services for mobile stations in the home network and may perform various functions as described below. H-MPC 160 may provide information to S-MPCs 150 and 152 to support positioning and may receive location information (e.g., position estimates, PDE addresses, etc.) from the S-MPCs.

A home location register/visitor location register (HLR/VLR) 126 stores registration information for mobile stations that have registered with visited network 102*a*. A domain name system (DNS) server 136 translates domain names (e.g., www.domain-name.com) into Internet Protocol (IP) addresses (e.g., 204.62.131.129), which are used by entities to communicate with each other via an IP network. DNS server 136 receives queries for IP addresses of domain names, determines the IP addresses for these domain names, and sends responses with the IP addresses to the requesting entities.

Applications (APPs) 112 and 170 may comprise LCS clients and/or higher-layer applications. An LCS client is a function or an entity that requests location information for LCS targets. An LCS target is a mobile station whose location is being sought. In general, an LCS client may reside in a network entity or a mobile station or may be external to both. LCS client 170 may communicate with H-MPC 160 to obtain location information for mobile station 110.

FIG. 1 also shows the interfaces between various network entities. Message center 144 may communicate with MSC 124 via a Short message delivery point-to-point bearer service (SMDPP) interface and with H-MPC 160 via a Short message peer-to-peer protocol (SMPP) interface. PDEs 140 to 142 may communicate with PDSN 134 via an IS-801 interface and with S-MPCs 150 and 152 via an E5' interface. S-MPCs 150 and 152 may communicate with PDSN 134 via an MS-MPC interface and with each other with H-MPC 160 via an MPC-MPC interface. H-MPC 160 may communicate with LCS client 170 via an L1 interface. These various interfaces are known in the art.

Figure 2:
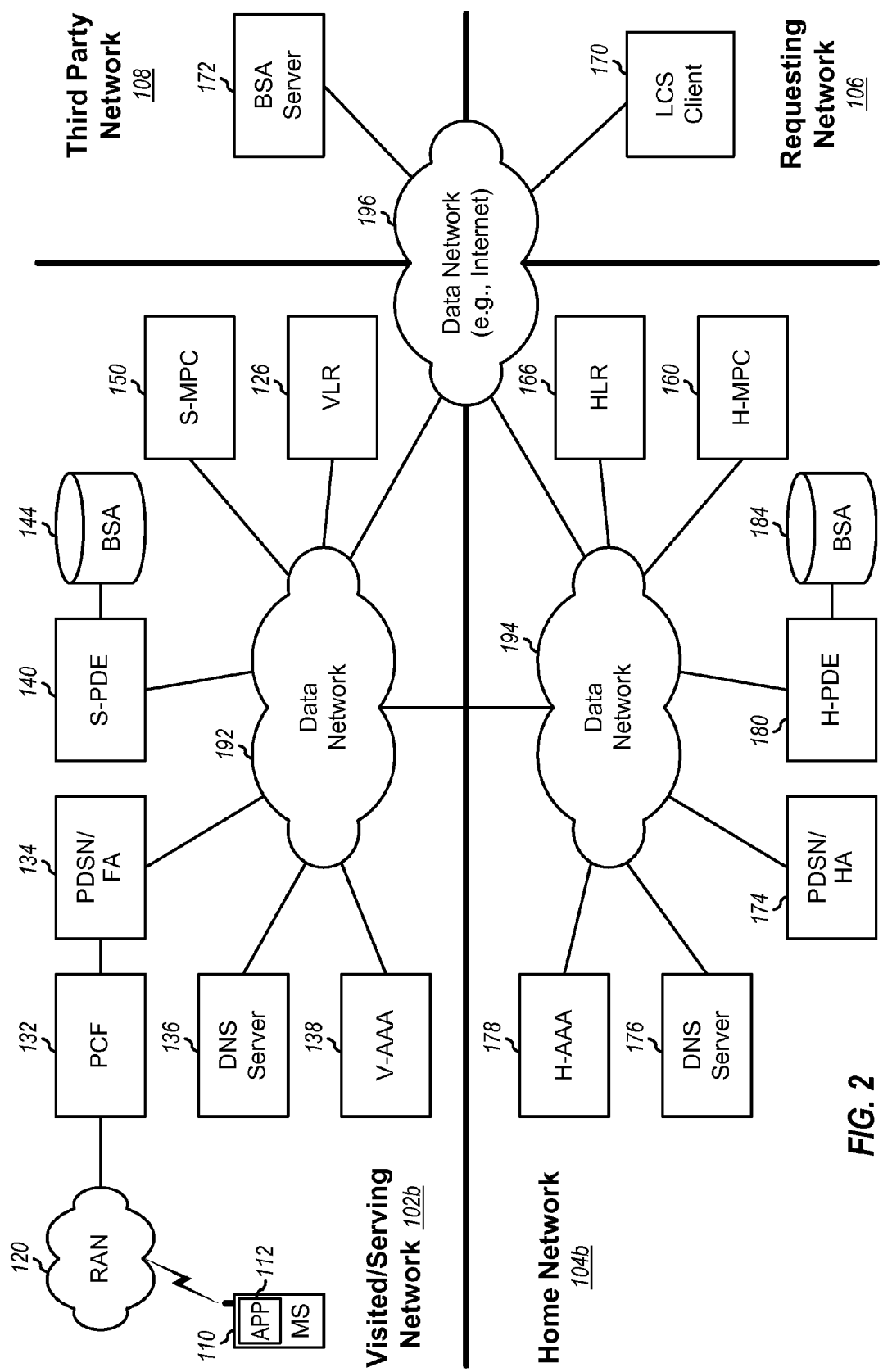
FIG. 2 shows another deployment of visited, home, and requesting networks.

FIG. 2 shows a deployment with a visited network 102*b*, a home network 104*b*, requesting network 106, and a third party network 108. In this deployment, visited network 102*b* includes RAN 120, PCF 132, PDSN 134, DNS server 136, VLR 126, S-PDE 140, and S-MPC 150 as described above for FIG. 1. PDSN 134 may be a foreign agent (FA) via which mobile station 110 exchanges packet data when roaming. Visited network 102*b* further includes an authentication, authorization, and accounting (V-AAA) entity 138 and a base station almanac (BSA) 144. (V-AAA) entity 138 performs authentication and authorization for LCS and other services. BSA 144 stores assistance data for satellites and/or base stations, which may be used to assist mobile station 110 with positioning. The network entities in visited network 102*b* may communicate with one another and with external entities via a data network 192, which may be an IP network or some other network.

Home network 104*b* includes H-MPC 160, a PDSN 174, a DNS server 176, an H-AAA entity 178, an HLR 166, a home PDE (H-PDE) 180, and a BSA 184 that may operate in similar manners as the corresponding network entities in visited network 102*b*. PDSN 174 may be a home agent (HA) with which mobile station 110 has registered and may be responsible for forwarding packets to mobile station 110. The network entities in home network 104*b* serve mobile stations communicating with home network 104*b*. The network entities in home network 104*b* may communicate with one another and with external entities via a data network 194, which may be an IP network, the Internet, or some other network.

Third party network 108 may include a BSA server 172 that may couple to PDEs in other networks not shown in FIG. 2. The entities in requesting network 106 and third party network 108 may communicate with the entities in visited network 102*b* and home network 104*b* via a data network 196, which may be an IP network or some other network.

FIGS. 1 and 2 show two examples of visited and home networks. In general, a network may include any combination of entities that may support any services offered by the network.

In the following description, visited network 102 may refer to visited network 102*a* in FIG. 1 and/or visited network 102*b* in FIG. 2. Home network 104 may refer to home network 104a in FIG. 1 and/or home network 104b in FIG. 2. Networks 102 and 104 may support a user plane location architecture. A user plane is a mechanism for carrying messages/signaling for higher-layer applications and employs a user-plane bearer, which is typically implemented with protocols such as User Datagram Protocol (UDP), Transmission Control Protocol (TCP), and Internet Protocol (IP), all of which are known in the art. Messages/signaling supporting location services and positioning may be carried as part of data (from a network perspective) in a user plane architecture.

Networks 102 and 104 may implement any user plane architecture such as V1 or V2 user plane from CDMA Development Group (CDG), X.S0024 user plane from 3GPP2, Secure User Plane Location (SUPL) from Open Mobile Alliance (OMA), etc. X.S0024 is applicable for 3GPP2 networks. SUPL is applicable for 3GPP and 3GPP2 networks. V2 user plane is described in a document 80-V6410-2NP, entitled "Location-Based Services V2 System Specification," Jan. 19, 2005. All of the user plane architectures are described in publicly available documents.

In the description herein, the term "MPC" generically refers to an entity that supports location services, the term "PDE" generically refers to an entity that supports positioning, the term "mobile station" generically refers to an entity that may communicate with an MPC for location services and/or a PDE for positioning, and the term "LCS client" generically refers to an entity that requests the location of a mobile station. An MPC may be an MPC in V1 and V2 user plane, a SUPL Location Center (SLC) in SUPL, a Position Server (PS) in X.S0024, a Gateway Mobile Location Center (GMLC) in 3GPP, etc. A PDE may be a PDE in V1 and V2 user plane, a SUPL Positioning Center (SPC) in SUPL, a Serving Mobile Location Center (SMLC) or a Standalone SMLC (SAS) in 3GPP, etc. A mobile station may be a mobile station in V1 and V2 user plane, a SUPL enabled terminal (SET) in SUPL, a user equipment (UE) in 3GPP, etc. The MPC, PDE, mobile station, and LCS client may also be referred to by other names in other networks and other location architectures.

Networks 102 and 104 may support LCS for roaming mobile stations based on trusted and/or non-trusted models. Table 1 gives short descriptions for the trusted and non-trusted models.

TABLE 1

| Model | Description |
|---|---|
| Trusted | Assume that LCS applications can be trusted, e.g., are authorized or authenticated via separate mechanisms. LCS applications may access PDEs directly. |
| Non-trusted | May perform service authorization for LCS applications prior to providing location services. LCS applications go through MPCs to access PDEs. |

For both trusted and non-trusted models, LCS may be requested by Wireless Application Protocol (WAP) pull applications, network-initiated applications, MS-resident applications, etc. WAP pull applications are applications that pull data from a network. Network-initiated applications are applications that are resident on the network side or interact with the network, e.g., LCS client 170. The MS-resident applications are applications that reside on mobile station 110 and may be Binary Runtime Environment for Wireless (BREW®) applications, Java® applications, etc.

Various location sessions may be supported such as single fix, tracking fix, gpsOne positioning, cell/sector positioning, etc. Single fix refers to the return of a single position fix for a target mobile station to an LCS client. Tracking fix refers to the return of multiple position fixes for a target mobile station to an LCS client, e.g., periodically. A tracking fix may be initiated by an LCS client or a mobile station and may be canceled by the LCS client or mobile station. The mobile station may also be handed off from one S-MPC to another S-MPC and/or from one S-PDE to another S-PDE during a tracking fix.

Various positioning methods/types may also be supported such as gpsOne positioning, cell/sector positioning, etc. gpsOne positioning refers to a satellite-based positioning method such as GPS, A-GPS, etc. Cell/sector positioning refers to a network-based positioning method such as A-FLT, E-OTD, OTDOA, Enhanced Cell ID, Cell ID, etc.

Various message flows may be used for different location sessions initiated by different applications in the trusted and non-trusted models. A message flow may also be referred to as a call flow, a process, etc. Some example message flows are described below. In the following message flows, mobile station 110 may have a data session with home network 104 using Mobile IP, Session Initiation Protocol (SIP), Layer 2 Tunneling Protocol (L2TP), or some other protocol that supports packet data roaming. For each message flow, service authorization may be performed for the non-trusted model and may be omitted for the trusted model.

Figure 3:
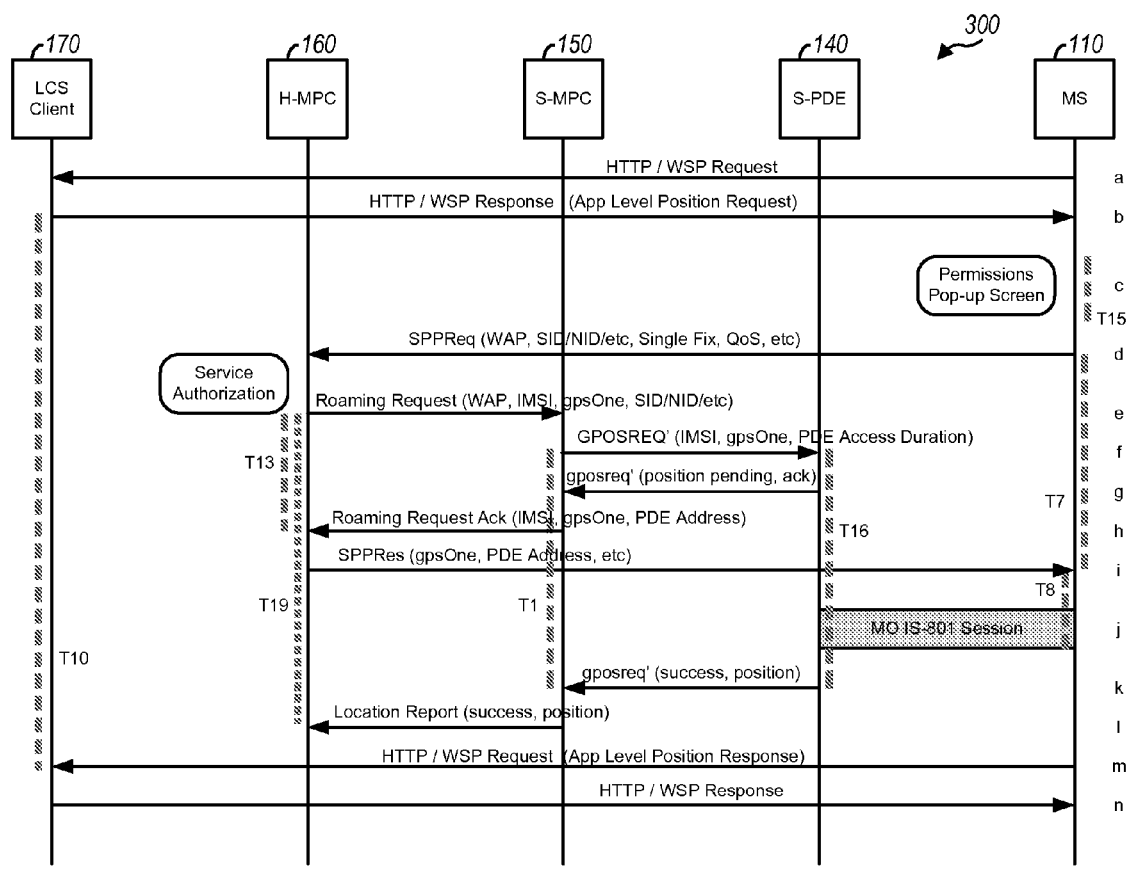
FIGS. 3 through 25 show various message flows for positioning with roaming.

FIG. 3 shows a message flow 300 for WAP pull single fix with gpsOne positioning. Mobile station 110 attempts to access a location-sensitive Uniform Resource Locator (URL) and sends a Hyper Text Transfer Protocol (HTTP)/Wireless Session Protocol (WSP) request to LCS client 170 (step a). LCS client 170 recognizes that mobile station 110 is gpsOne-enabled and proceeds with an appropriate message flow. LCS client 170 responds to the HTTP request with an HTTP response containing a gpsOne trigger (step b). Mobile station 110 receives the HTTP response and may prompt the user for permission to proceed with positioning (step c). After receiving user permission, if applicable, mobile station 110 sends a Start Positioning Process Request (SPPReq) message to H-MPC 160 (step d). The SPPReq message may include information such as an application type (which is set to WAP in this case), a system identifier (SID) and a network identifier (NID), a single fix indication, positioning quality of service (QoS) information, etc. The SID/NID identifies visited network 102 currently serving mobile station 110 and may be obtained via a System Parameter message broadcast by base stations in the visited network.

In general, mobile station 110 may send any information that can provide the current network location of mobile station 110. This network location information may be dependent on radio technology. For example, a SID, a NID, and/or a base station identifier (BaseID) may be used for IS-2000 Releases 0 and A, which are commonly referred to as CDMA2000 1X. A sector identifier (SectorID) may be used for IS-856, which is commonly referred to as CDMA2000 1xEV-DO. A mobile country code (MCC), a mobile network code (MNC), a location area code (LAC), and/or a cell identity (CI) may be used for GSM. An MCC, an MNC, and/or a UTRAN cell identity (UC-ID) may be used for W-CDMA. An access point identifier (AP ID) or a Medium Access Control (MAC) address may be used for WLAN. The network location information may also comprise location coordinates (e.g., latitude and longitude coordinates) of a base station in a cellular network, an access point in a WLAN, or some other transmitting station in a wireless network. For clarity, much of the description below assumes the use of SID and NID for the network location information.

H-MPC 160 receives the SPPReq message and performs authorization, if applicable, to ensure that this particular user and LCS client are authorized to obtain the location being requested (step e). H-MPC 160 may use the QoS information in the SPPReq message and LCS client profile to determine whether a gpsOne position is appropriate (as opposed to either a cached position or a cell/sector-based position). H-MPC 160 determines that mobile station 110 is roaming and selects a suitable S-MPC (which in this example is S-MPC 150) based on the SID/NID information. H-MPC 160 then sends to S-MPC 150 a Roaming Request message that may include information such as the application type, an International Mobile Subscriber Identifier (IMSI) of mobile station 110, gpsOne positioning type, the SID/NID, a PDE access duration, etc.

S-MPC 150 receives the Roaming Request message with instructions to do gpsOne positioning from H-MPC 160 and determines a suitable S-PDE (which in this example is S-PDE 140) based on the SID/NID information. S-MPC 150 then sends a GPOSREQ' message that invokes and seeds S-PDE 140 such that the S-PDE will accept an incoming mobile-originated (MO) IS-801 positioning session from mobile station 110 (step f). An IS-801 positioning session is a session for satellite-based positioning (e.g., to obtain assistance data, a position estimate, etc.) and is also referred to as an IS-801 session, a gpsOne session, a GPS session, etc. The GPOSREQ' message may include information such as the IMSI, gpsOne positioning type, PDE access duration, etc. S-PDE 140 returns a gposreq' message containing a position pending acknowledgment for the GPOSREQ' message (step g). S-MPC 150 receives the gposreq' message from S-PDE 140 and sends to H-MPC 160 a Roaming Request Acknowledgment message with the address of S-PDE 140 (step h). H-MPC 160 receives the Acknowledgment from S-MPC 150 and sends an SPPRes message instructing mobile station 110 to perform an IS-801 session and including the address of S-PDE 140 (step i).

Mobile station 110 and S-PDE 140 then perform an MO IS-801 session (step j). A position estimate of mobile station 110 is obtained and made available to the mobile station at the end of the IS-801 session. S-PDE 140 then sends a gposreq' message that informs S-MPC 150 that the IS-801 session terminated normally and includes the position estimate (step k).

S-MPC 150 sends to H-MPC 160 a Location Report message that reports successful positioning and provides the position estimate (step l). H-MPC 160 may store the position estimate, which may be used later as a cached position for a subsequent request. Mobile station 110 then re-requests the location-sensitive URL and provides the position estimate along with the request (step m). LCS client 170 downloads the requested content to mobile station 110 (step n).

The messages between the various entities are described in the following publicly available document:
- 80-V5456-2NP, entitled "gpsOne® UserPlane MS-MPC Protocol Specification," Jan. 5, 2005—describes messages between mobile stations and MPCs (e.g., the SPPReq and SPPRes) and between mobile stations and LCS clients (e.g., the HTTP/WSP Request and Response),
- 80-V6195-2NP, entitled "Mobile Positioning Center (MPC) V2 Protocol Specification," Jan. 21, 2005—describes messages among MPCs (e.g., the Roaming Request, Roaming Request Ack, and Location Report),
- 80-V5458-2NP, entitled "gpsOne® UserPlane E5' V2 Protocol Specification," Dec. 13, 2003—describes messages between MPCs and PDEs (e.g., the GPOSREQ' and gposreq'), and
- TIA/EIA/IS-801, entitled "Position Determination Service Standards for Dual Mode Spread Spectrum Systems,"—describes messages between mobile stations and PDEs.

Figure 4:
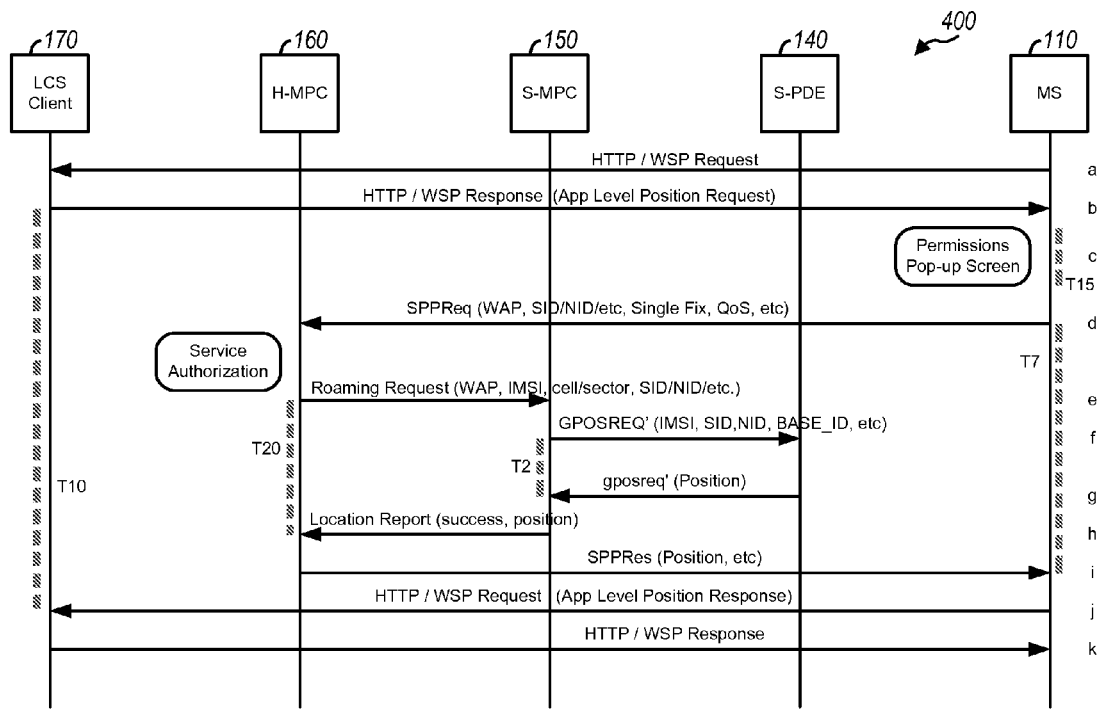

FIG. 4 shows a message flow 400 for WAP pull single fix with cell/sector positioning. Steps a through d of message flow 400 are the same as steps a through d of message flow 300 in FIG. 3. In step e, H-MPC 160 determines that mobile station 110 is roaming based on the SID/NID information and decides that cell/sector positioning is appropriate. H-MPC 160 determines a suitable S-MPC (which in this example is S-MPC 150) based on the SID/NID information and sends to S-MPC 150 a Roaming Request message with a cell/sector positioning type, etc.

S-MPC 150 receives the Roaming Request message with instructions to do cell/sector positioning from H-MPC 160 and sends to S-PDE 140 a GPOSREQ' message containing the cell/sector positioning type, etc. (step f). S-PDE 140 responds to S-MPC 150 with a gposreq' message containing a cell/sector-based position estimate for mobile station 110 (step g). S-MPC 150 sends to H-MPC 160 a Location Report message that reports successful positioning and includes the position estimate (step h). H-MPC 160 sends to mobile station 110 an SPPRes message containing the position estimate (step i). Steps j and k of message flow 400 are the same as steps m and n, respectively, of message flow 300 in FIG. 3.

Figure 5:
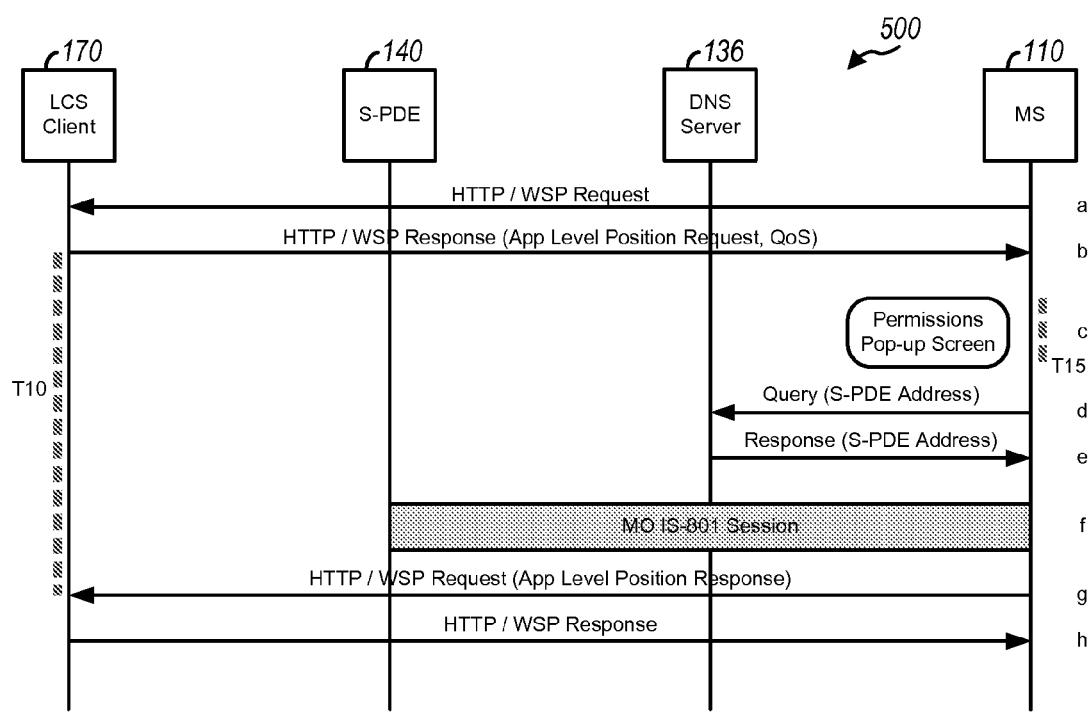

FIG. 5 shows a message flow 500 for WAP pull single fix with gpsOne positioning using DNS query. Steps a through c of message flow 500 are the same as steps a through c of message flow 300 in FIG. 3. Mobile station 110 recognizes that it is roaming and sends a query to DNS server 136 for an address (e.g., an IP address) of S-PDE 140 (step d). The query may include a location-specific DNS string or URL such as, e.g., SID.NID.Local.PDE. DNS server 136 responds with the address of S-PDE 140 (step e). Mobile station 110 and S-PDE 140 then perform an MO IS-801 session and a position estimate is made available to the mobile station at the end of the IS-801 session (step f). Steps g and h of message flow 500 are the same as steps m and n, respectively, of message flow 300 in FIG. 3.

In general, mobile station 110 may send a location-specific DNS query to DNS server 136 (V-DNS) in visited network 102 (as shown in FIG. 5) or to DNS server 176 (H-DNS) in home network 104 (not shown in FIG. 5). For the V-DNS option, DNS server 136 may be assigned by PDSN/FA 134 during PPP negotiation for data call setup. Mobile station 110 may send a DNS query to DNS server 136, which may recognize and resolve the location-specific URL and return the IP address of an S-PDE in visited network 102 to mobile station 110. For the H-DNS option, mobile station 110 may send a DNS query, which may be re-directed by home agent 174 to DNS server 176. DNS server 176 may resolve the location-specific URL and return the S-PDE IP address to mobile station 110. For both DNS options, the SID/NID information may be omitted from the DNS query if visited network 104 has one PDE or designates one PDE to serve roaming mobile stations.

Figure 6:
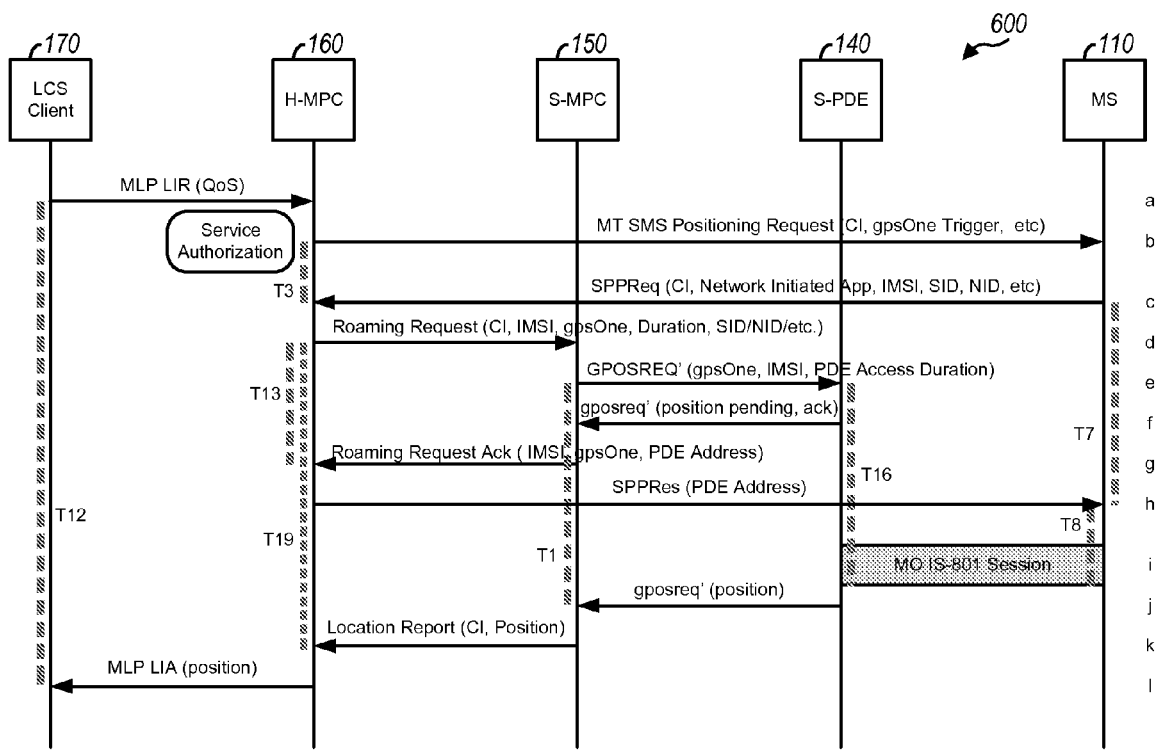

FIG. 6 shows a message flow 600 for network-initiated single fix with gpsOne positioning. LCS client 170 requests the location of mobile station 110 from H-MPC 160 via a Mobile Location Protocol (MLP) Location Immediate Request (LIR) message (step a). H-MPC 160 may verify that LCS client 170 is authorized to obtain the location of the user (step b). After successful authorization, if applicable, H-MPC 160 sends to mobile station 110 a mobile-terminated (MT) SMS Positioning Request message indicating gpsOne positioning and including information such as notification and verification procedures, a correlation identifier (CI) used to identify the location session, etc. (also step b). Mobile station 110 receives the SMS message and, if applicable, prompts the user for consent. Mobile station 110 then sends to H-MPC 160 an SPPReq message that serves as a response to the MT SMS message in step b and may include information such as the CI, IMSI, SID/NID, etc. (step c).

H-MPC 160 determines that mobile station 110 is roaming and selects S-MPC 150 based on the SID/NID information. H-MPC 160 then sends to S-MPC 150 a Roaming Request message that may include information such as the CI, IMSI, SID/NID, PDE access duration, etc. (step d). S-MPC 150 receives the Roaming Request message with instructions to do gpsOne positioning and sends a GPOSREQ' message that invokes and seeds S-PDE 140 (step e). S-PDE 140 returns a gposreq' message containing a position pending acknowledgment (step f). S-MPC 150 receives the gposreq' message and sends to H-MPC 160 a Roaming Request Acknowledgment message with the address of S-PDE 140 (step g).

H-MPC 160 receives the Acknowledgment message from S-MPC 150 and sends to mobile station 110 an SPPRes message instructing mobile station 110 to perform an IS-801 session and including the address of S-PDE 140 (step h). Mobile station 110 and S-PDE 140 perform an MO IS-801 session to obtain a position estimate of the mobile station (step i). S-PDE 140 then sends the position estimate in a gposreq' message to S-MPC 150 (step j). S-MPC 150 forwards the position estimate in a Location Report message to H-MPC 160 (step k). H-MPC 160 then provides the position estimate in an MLP Location Immediate Answer (LIA) message to LCS client 170 (step l).

Figure 7:
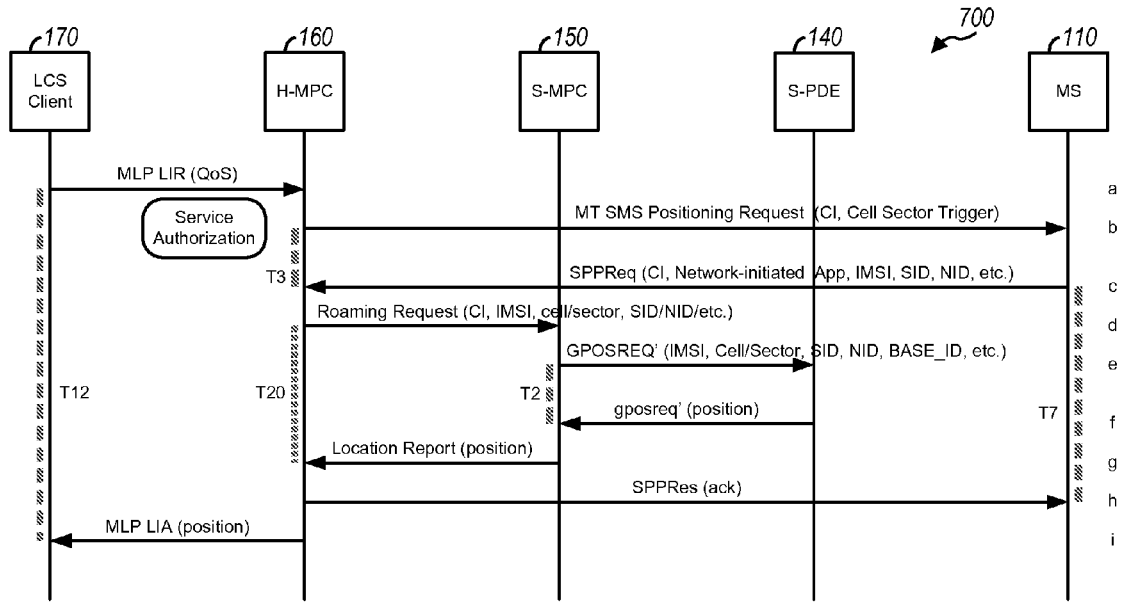

FIG. 7 shows a message flow 700 for network-initiated single fix with cell/sector positioning. Steps a through e of message flow 700 are similar to steps a through e of message flow 600 in FIG. 6, with the exception of positioning method. The SMS message sent by H-MPC 160 in step b indicates cell/sector positioning instead of gpsOne positioning. The SPPReq message sent by mobile station 110 in step c includes information (e.g., SID/NID, etc.) that is pertinent for a cell/sector fix. The Roaming Request message sent by H-MPC 160 to S-MPC 150 in step d indicates cell/sector positioning. The GPOSREQ' message sent by S-MPC 150 to S-PDE 140 in step e indicates cell/sector positioning and may include a base station ID, etc. S-PDE 140 provides a cell/sector-based position estimate in a gposreq' message to S-MPC 150 (step f). S-MPC 150 forwards the position estimate in a Location Report message to H-MPC 160 (step g). H-MPC 160 sends an SPPRes message with an acknowledgement to mobile station 110 (step h) and provides the position estimate to LCS client 170 (step i).

Figure 8:
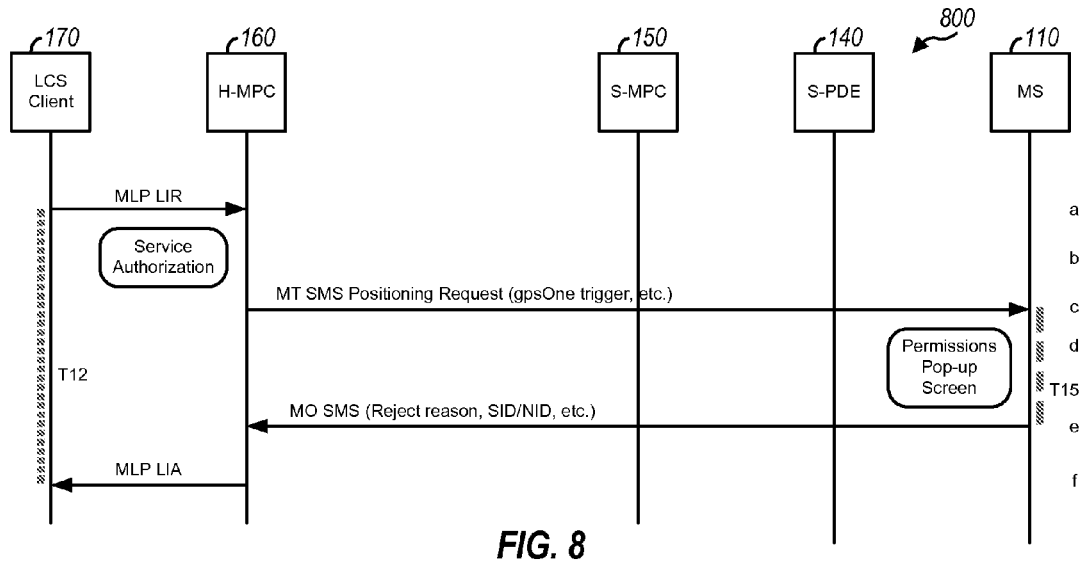

FIG. 8 shows a message flow 800 for a network-initiated positioning session rejected by mobile station 110. Steps a and b of message flow 800 are the same as steps a and b of message flow 600 in FIG. 6. H-MPC 160 may verify that LCS client 170 is authorized to obtain the location of mobile station 110. H-MPC 160 then sends to mobile station 110 an MT SMS Positioning Request message indicating gpsOne or cell/sector positioning and including information such as notification and verification procedures (step c). Mobile station 110 receives the SMS message and, if applicable, prompts the user for consent (step d). If the user rejects the request or if the request cannot be served (e.g., because a voice call is in progress, etc.), then mobile station 110 sends to H-MPC 160 an MO SMS message that rejects the positioning request and serves as a response to the MT SMS message (step e). The MO SMS message may include an appropriate reject reason code. If the user rejects a gpsOne positioning request, then no IS-801 session occurs. If the reject reason indicates that user consent is obtained but a TCP/IP socket could not be opened, then H-MPC 160 may trigger a lower accuracy (e.g., cell/sector) positioning session. H-MPC 160 provides the position status to LCS client 170 (step f).

Figure 9:
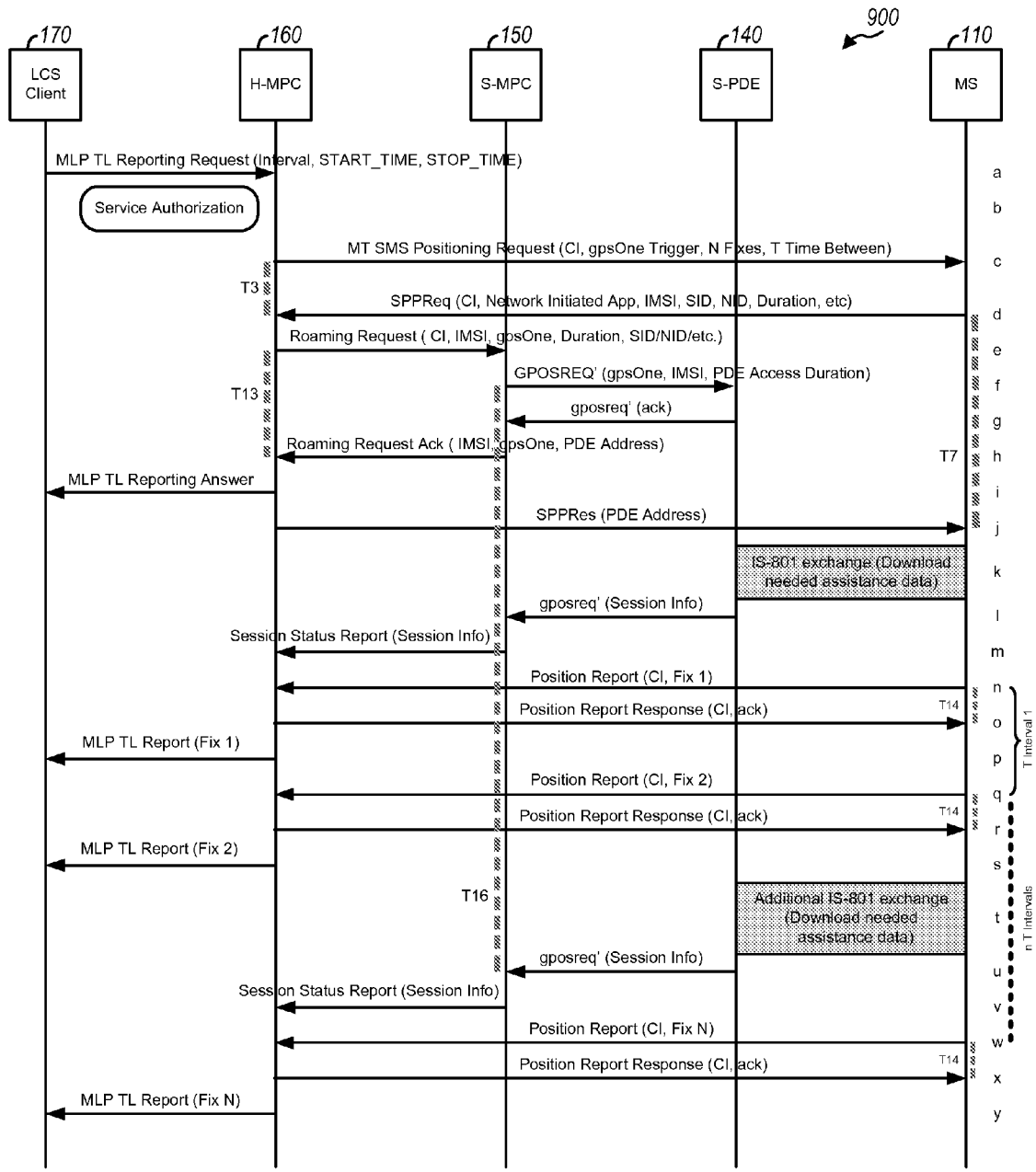

FIG. 9 shows a message flow 900 for network-initiated tracking fix with gpsOne positioning. LCS client 170 requests the location of mobile station 110 from H-MPC 160 via an MLP Triggered Location (TL) Reporting Request message (step a). This request may include a start time, a stop time, and a time interval between position fixes (T) for the tracking fix session, QoS information, etc. H-MPC 160 may verify that LCS client 170 is authorized for this type of request for the user (step b). H-MPC 160 may also use the QoS information and LCS client profile to determine if gpsOne position is appropriate (as opposed to either a cached position or a cell/sector-based position). In this case, H-MPC 160 determines that gpsOne positioning is appropriate. H-MPC 160 may determine the number of fixes based on the start time, stop time, and interval received from LCS client 170.

After successful authorization of LCS client 170, if applicable, H-MPC 160 sends to mobile station 110 an MT SMS Positioning Request message indicating an IS-801 session and including information such as notification and verification procedures, a CI, the number of fixes (N), the time interval between fixes (T), the H-MPC ID, etc. (step c). Mobile station 110 receives the SMS message and, if applicable, prompts the user for consent. Mobile station 110 then sends to H-MPC 160 an SPPReq message that serves as a response to the MT SMS message in step c and may include information such as the user consent or lack of consent, CI, IMSI, SID/NID, session duration, etc. (step d). The session duration is equal to the number of fixes times the interval between fixes.

H-MPC 160 determines that mobile station 110 is roaming and selects S-MPC 150 based on the SID/NID information. H-MPC 160 then sends to S-MPC 150 a Roaming Request message with information used by S-MPC 150 to support a tracking session with gpsOne positioning (step e). This information may include the CI, IMSI, SID/NID, session duration, stop time, etc. S-MPC 150 receives the Roaming Request message with instructions to do gpsOne positioning and sends to S-PDE 140 a GPOSREQ' message that invokes and seeds S-PDE 140 and includes information (e.g., PDE access duration) for the tracking session (step f). S-PDE 140 returns a gposreq' message containing an acknowledgment (step g). S-MPC 150 receives the gposreq' message and sends to H-MPC 160 a Roaming Request Acknowledgment message with the address of S-PDE 140 (step h).

H-MPC 160 sends an MLP TL Reporting Answer to LCS client 170 (step i), which may occur after step b if user consent is not needed or after step d if user consent is needed and obtained. After receiving the Acknowledgment in step h, H-MPC 160 sends to mobile station 110 an SPPRes message instructing mobile station 110 to perform an IS-801 session and including the address of S-PDE 140 (step j). Mobile station 110 and S-PDE 140 perform an MO IS-801 session, e.g., to download assistance data to mobile station 110 (step k). S-PDE 140 then provides relevant information on the IS-801 session completion in a gposreq' message to S-MPC 150 (step l). S-MPC 150 forwards the information on session completion in a Session Status Report message to H-MPC 160 (step m).

For the first position fix, mobile station 110 provides location information in a Position Report message to H-MPC 160 (step n). H-MPC 160 returns a Position Report Response to acknowledge the Position Report message (step o). H-MPC 160 reports the location of mobile station 110 via an MLP TL Report message sent to LCS client 170 (step p). For the second position fix, which occurs at interval T later, steps n, o and p are repeated as steps q, r and s, respectively. Mobile station 110 and S-PDE 140 may perform additional MO IS-801 sessions, whenever needed, to download assistance data and to provide updated location information. Steps k, l and m may be repeated as steps t, u and v, respectively. Each additional fix may be achieved by repeating steps n, o and p. For the last position fix, steps n, o and p are repeated as steps w, x and y, respectively. MS-assisted tracking may be used for cases when the time between fixes is greater than a particular interval (e.g., 1800 seconds).

Figure 10:
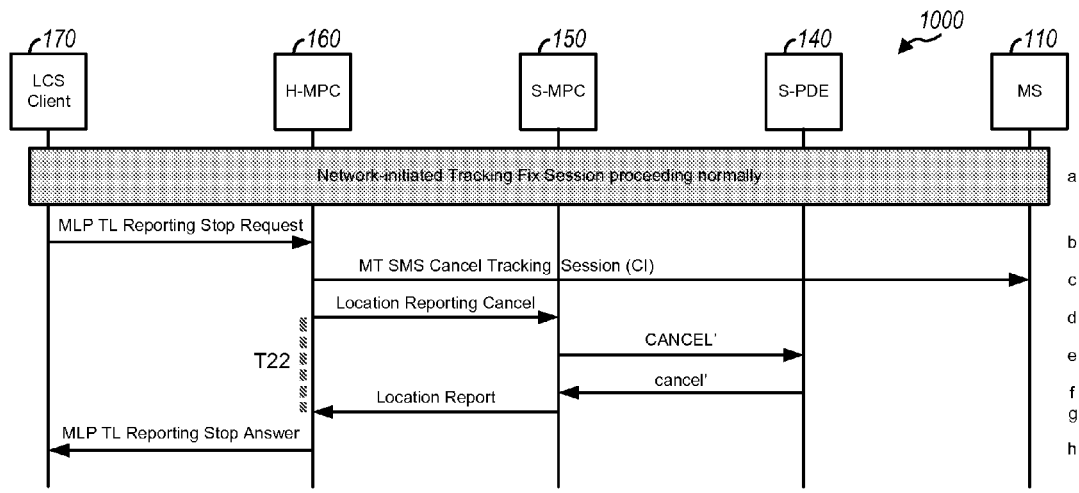

FIG. 10 shows a message flow 1000 for canceling a network-initiated tracking session by LCS client 170. A network-initiated tracking session for mobile station 110 may be started as shown in FIG. 9 and may proceed normally (step a). At any time during the tracking session, LCS client 170 may send to H-MPC 160 an MLP TL Reporting Stop Request message to cancel the tracking session (step b). H-MPC 160 then sends to mobile station 110 an MT SMS Cancel Tracking Session message indicating no further fixes are needed (step c). When delivery of the MT SMS message to mobile station 110 is confirmed, H-MPC 160 sends a Location Reporting Cancel message to S-MPC 150 (step d). S-MPC 150 receives the Location Reporting Cancel message and sends a CANCEL' message to S-PDE 140 (step e), which returns a cancel' message to S-MPC 150 (step f). S-MPC 150 sends to H-MPC 160 a Location Report message indicating that the tracking session has been canceled and with position result set to "Not Applicable" (step g). H-MPC 160 completes the tracking session closure by sending an MLP TL Reporting Stop Answer to LCS client 170 (step h).

Figure 11:
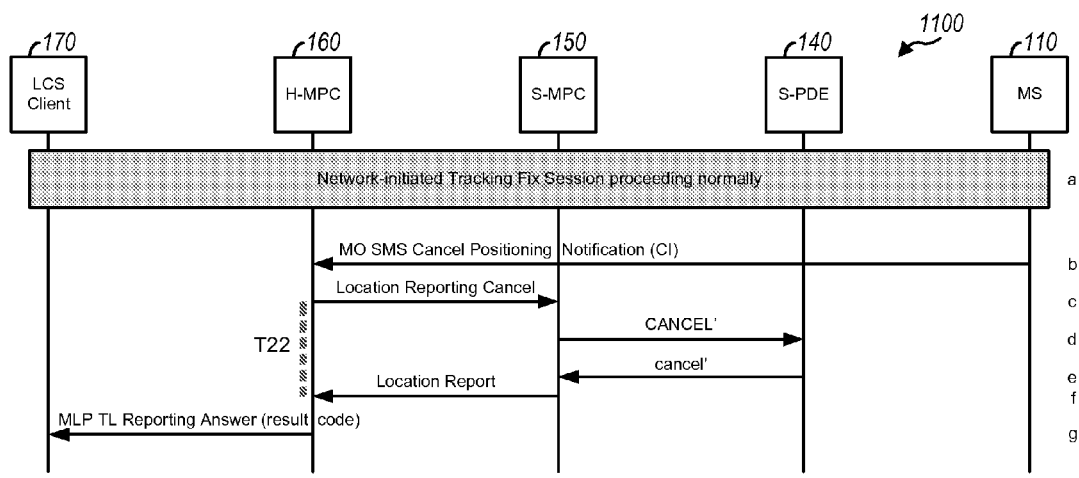

FIG. 11 shows a message flow 1100 for canceling a network-initiated tracking session by mobile station 110. A network-initiated tracking session for mobile station 110 may be started as shown in FIG. 9 and may proceed normally (step a). At any time during the tracking session, mobile station 110 may send to H-MPC 160 an MO SMS Cancel Positioning Notification message to cancel the tracking session (step b). Steps c through g of message flow 1100 are the same as steps d through h, respectively, of message flow 1000.

Mobile station 110 may have a pending network-initiated tracking session and may roam outside the coverage of the current S-MPC 150 and S-PDE 140. H-MPC 160 may receive from S-MPC 150 a Session Status Report message indicating that mobile station 110 is outside the serving area of S-PDE 140. H-MPC 160 may then send to mobile station 110 a Position Report Response message containing information on a new S-PDE that can serve mobile station 110 at its current location.

Figure 12:
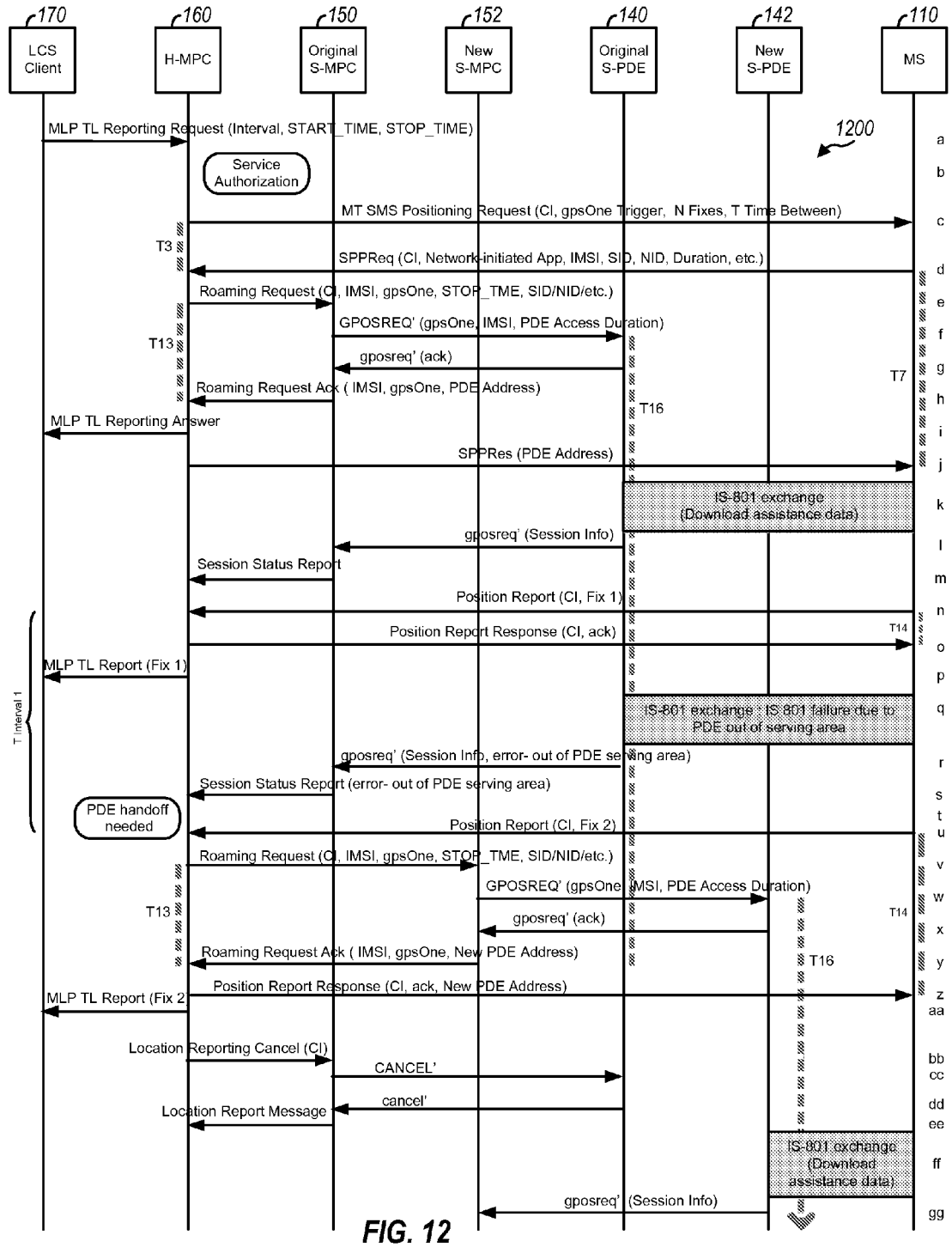

FIG. 12 shows a message flow 1200 for network-initiated tracking fix with inter-MPC handoff. Steps a through m of message flow 1200 are for initiation of a tracking session and are the same as steps a through m, respectively, of message flow 900 in FIG. 9. Steps n, p and q of message flow 1200 are for the first position fix and are the same as steps n, p and q, respectively, of message flow 900.

At a later time, mobile station 110 and S-PDE 140 perform another MO IS-801 session that fails because mobile station 110 is outside the serving area of S-PDE 140 (step q). S-PDE 140 then informs S-MPC 150 of the IS-801 session failure by sending a gposreq' message with an error reason of "S-PDE out of serving area", which means that mobile station 110 is outside the serving area of S-PDE 140 (step r). S-MPC 150 reports the status of the IS-801 session to H-MPC 160 via a Session Status Report message that contains the IS-801 session information and the error reason indicated by S-PDE 140 (step s). H-MPC 160 determines that mobile station 110 is roaming and is outside the serving area of S-PDE 140 (step t).

After interval T has passed, mobile station 110 sends a Position Report message to H-MPC 160 (step u). H-MPC 160 uses the SID/NID information in the Position Report message to determine a new S-MPC, which in this example is S-MPC 152. H-MPC 160 then triggers roaming procedures. To determine a new S-PDE, H-MPC 160 sends to S-MPC 152 a Roaming Request message with information used by S-MPC 152 to support the remaining tracking session with gpsOne positioning (step v). This information may include the stop time, remaining session duration, etc. S-MPC 152 receives the Roaming Request message with instructions to do gpsOne positioning and sends to a new S-PDE (which in this example is S-PDE 142) a GPOSREQ' message that invokes S-PDE 142 and includes information (e.g., PDE access duration) for the remaining tracking session (step w). The GPOSREQ' message also seeds S-PDE 142 such that it will accept an incoming MO IS-801 session for the tracking session. S-PDE 142 returns a gposreq' message containing an acknowledgment (step x). S-MPC 152 receives the gposreq' message and sends to H-MPC 160 a Roaming Request Acknowledgment message with the address of S-PDE 142 (step y).

H-MPC 160 then sends to mobile station 110 a Position Report Response message that acknowledges the Position Report message in step u and includes information for new S-PDE 142 (step z). H-MPC 160 reports the location of mobile station 110 in an MLP TL Report message to LCS client 170 (step aa). H-MPC 160 also sends to original S-MPC 150 a Location Reporting Cancel message to inform S-MPC 150 that it should clear resources allocated to the tracking session (step bb). S-MPC 150 receives the Location Reporting Cancel message and sends a CANCEL' message to original S-PDE 140 (step cc), which returns a cancel' message to S-MPC 150 (step dd). S-MPC 150 then sends to H-MPC 160 a Location Report message that acknowledges the Location Reporting Cancel message (step ee). Mobile station 110 may perform an MO IS-801 session with new S-PDE 142 (step ff). S-PDE 142 provides information on the IS-801 session completion to S-MPC 152. The remaining tracking session may proceed as described above for message flow 900 in FIG. 9, albeit with new S-MPC 152 and new S-PDE 142.

Mobile station 110 may have a pending network-initiated tracking session and may roam outside the coverage of the current S-PDE 140 but may remain within the coverage of S-MPC 150. H-MPC 160 may then send information on a new S-PDE that can serve mobile station 110 at its current location.

Figure 13:
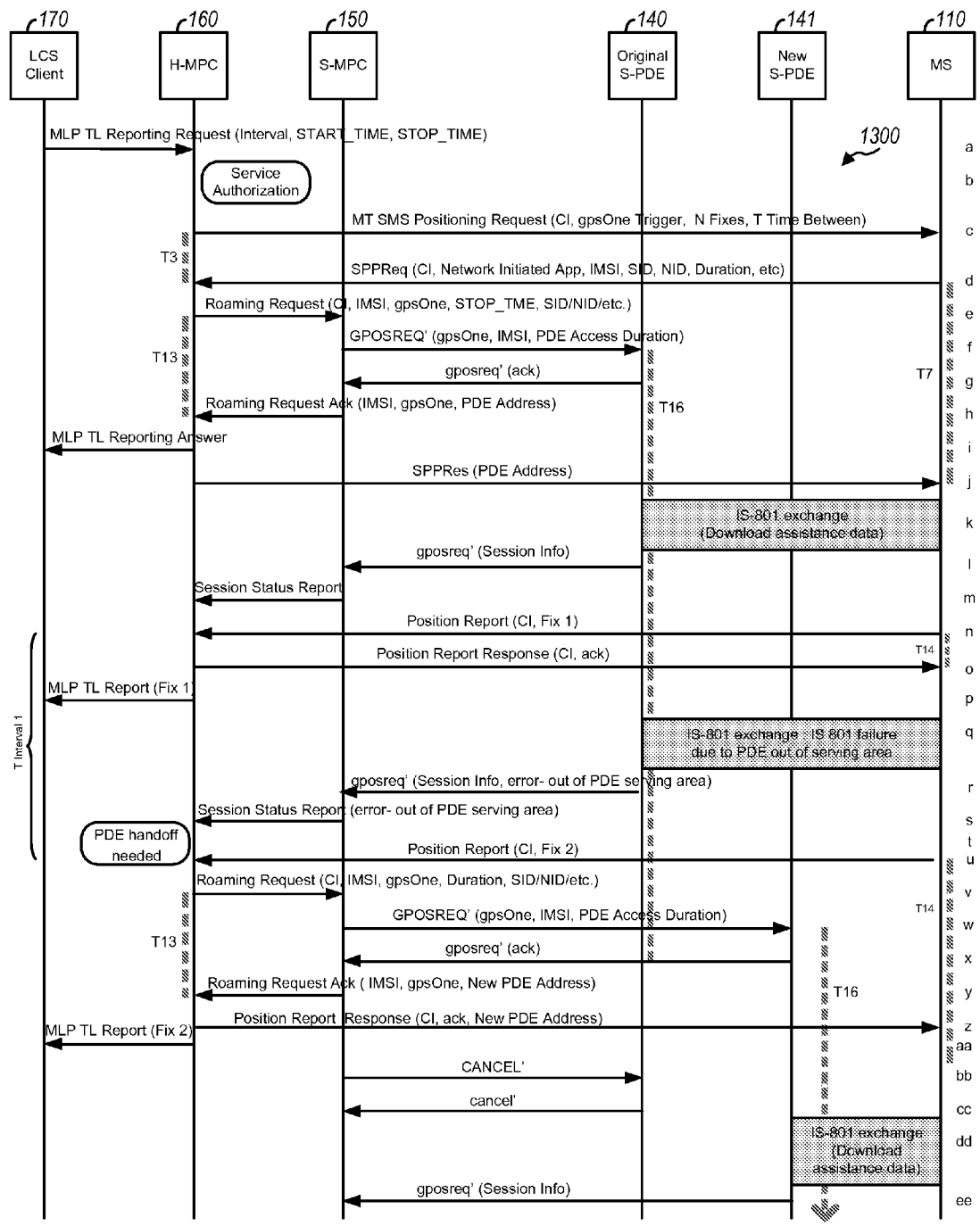

FIG. 13 shows a message flow 1300 for network-initiated tracking fix with intra-MPC handoff. Steps a through u of message flow 1300 are the same as steps a through u, respectively, of message flow 1200 in FIG. 12. H-MPC 160 determines that S-MPC 150 can serve mobile station 110 based on the SID/NID information received from mobile station 110 in step u. To determine a new S-PDE, H-MPC 160 sends to S-MPC 150 a Roaming Request message including information (e.g., the stop time, remaining session duration, etc.) used by S-MPC 150 to support the remaining tracking session with gpsOne positioning (step v). S-MPC 150 receives the Roaming Request message with instructions to do gpsOne positioning from H-MPC 160 and sends to a new S-PDE (which in this example is S-PDE 141) a GPOSREQ' message that invokes and seeds S-PDE 141 and includes information (e.g., PDE access duration) for the remaining tracking session (step w). S-PDE 141 returns a gposreq' message containing an acknowledgment (step x). S-MPC 150 receives the gposreq' message and sends to H-MPC 160 a Roaming Request Acknowledgment message with the address of S-PDE 141 (step y). H-MPC 160 then sends to mobile station 110 a Position Report Response message that acknowledges the Position Report message in step u and contains information for new S-PDE 141 (step z). H-MPC 160 reports the location of mobile station 110 in an MLP TL Report message to LCS client 170 (step aa). Steps bb, cc, dd and ee of message flow 1300 are the same as steps cc, dd, ff and gg, respectively, of message flow 1200. The remaining tracking session may proceed as described above for message flow 900 in FIG. 9, albeit with original S-MPC 150 and new S-PDE 141.

Figure 14:
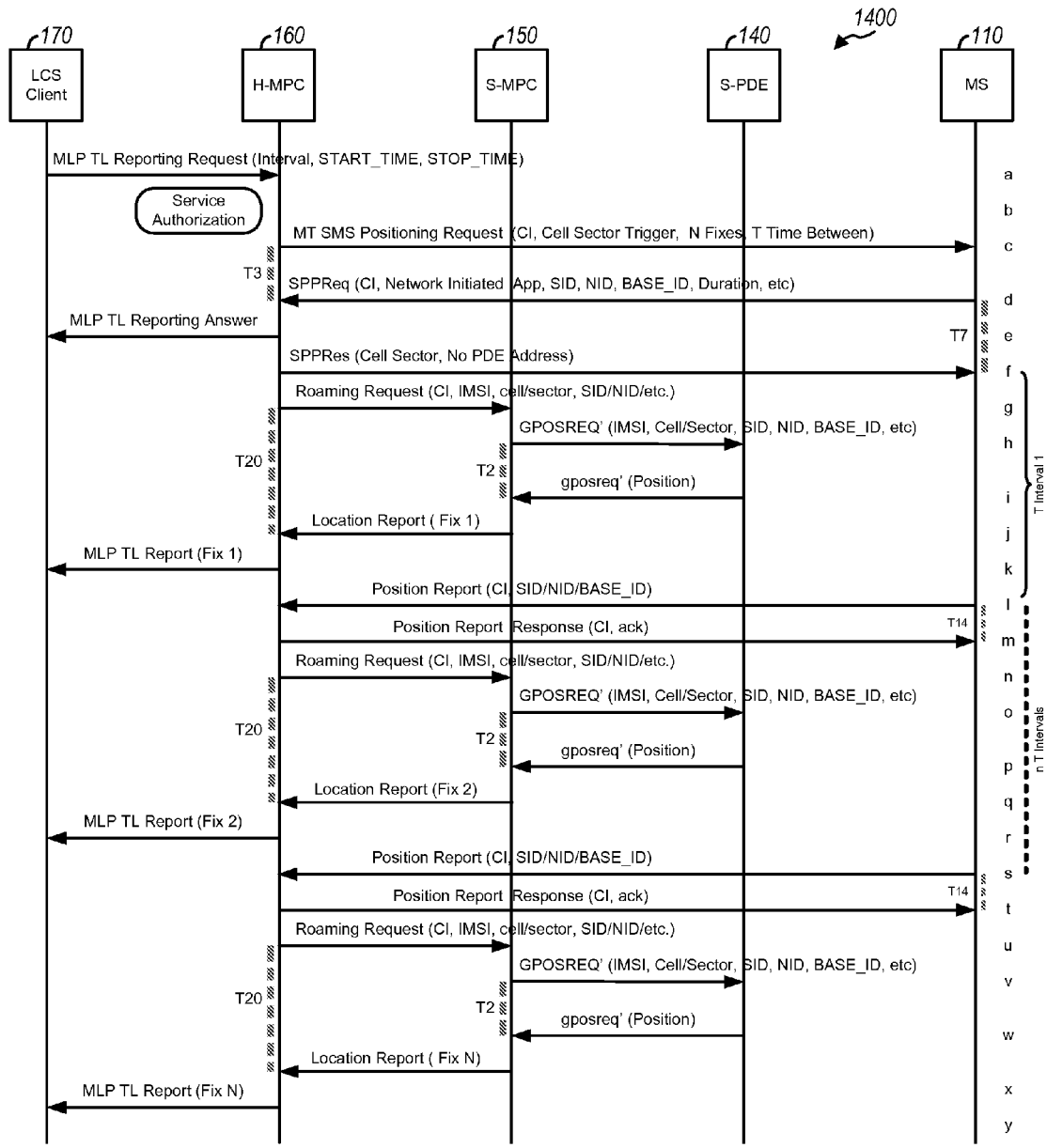

FIG. 14 shows a message flow 1400 for network-initiated tracking fix with cell/sector positioning. Steps a and b of message flow 1400 are similar to a and b of message flow 900 in FIG. 9. However, in this case, H-MPC 160 determines that cell/sector positioning is appropriate. H-MPC 160 sends to mobile station 110 an MT SMS Positioning Request message indicating cell/sector positioning and including information such as notification and verification procedures, a CI, the number of fixes (N), the time interval between fixes (T), the H-MPC ID, etc. (step c). Mobile station 110 receives the SMS message and, if applicable, prompts the user for consent. Mobile station 110 then sends to H-MPC 160 an SPPReq message that serves as a response to the MT SMS message in step c and may include information such as the user consent or lack of consent, CI, IMSI, SID/NID, session duration, etc. (step d). H-MPC 160 sends an MLP TL Reporting Answer to LCS client 170 (step e). H-MPC 160 also sends to mobile station 110 an SPPRes message instructing mobile station 110 to use cell/sector positioning (step f).

H-MPC 160 determines that mobile station 110 is roaming and selects S-MPC 150 based on the SID/NID information. H-MPC 160 then sends to S-MPC 150 a Roaming Request message with information used by S-MPC 150 to support a tracking session with cell/sector positioning (step g). S-MPC 150 receives the Roaming Request message with instructions to do cell/sector positioning and sends to S-PDE 140 a GPOS-REQ' message with information for cell/sector positioning (step h). S-PDE 140 returns a gposreq' message containing a cell/sector-based position estimate for mobile station 110 (step i). S-MPC 150 forwards the position estimate in a Location Report message to H-MPC 160 (step j). H-MPC 160 provides the position estimate for the first fix in an MLP TL Report message to LCS client (step k).

For the second position fix after interval T has passed, mobile station 110 sends to H-MPC 160 a Position Report message containing information such as the current SID/NID, BASE_ID, etc. (step l). H-MPC 160 returns a Position Report Response message that acknowledges the Position Report message (step m). Subsequent steps n through r for the second fix are the same as steps g through k, respectively, for the first fix. Each additional fix may be achieved by repeating steps l through r. The tracking session continues until the last fix is reported in steps s through y. To S-MPC 150 and S-PDE 140, the tracking fix with cell/sector positioning is achieved with a series of single fixes.

LCS client 170 may terminate message flow 1400 by sending an MLP TL Reporting Stop Request message (as shown in FIG. 10) or some other message. Mobile station 110 may terminate message flow 1400 by sending an MT SMS Cancel Tracking Session message (as shown in FIG. 11) or some other message. LCS client 170 or mobile station 110 may also terminate message flow 1400 in similar manner as for a message flow for tracking fix of a mobile station within an area served by its H-MPC.

Figure 15:
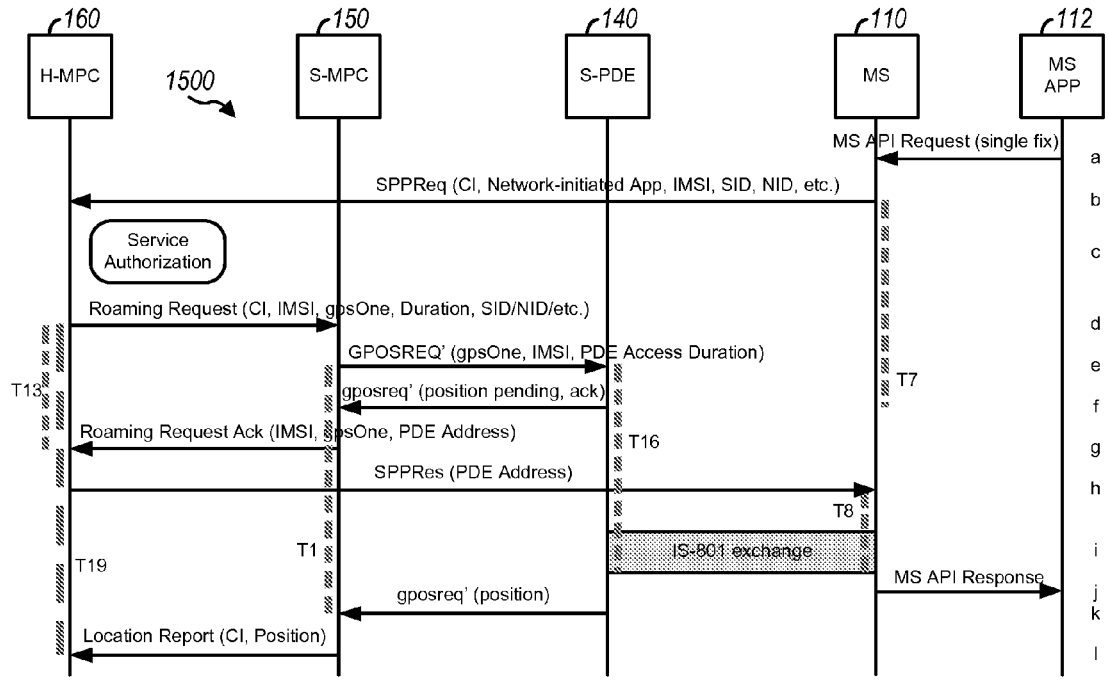

FIG. 15 shows a message flow 1500 for MS-resident single fix with gpsOne positioning. MS-resident application 112 invokes a gpsOne Application Programming Interface (API) to request a single fix with gpsOne positioning (step a). User notification and/or verification may occur prior to and/or after step a. If the user triggers an MS-resident single-fix application, then steps b through i, k and l are performed as described above for steps c through k, respectively, of message flow 600 in FIG. 6. A position estimate of mobile station 110 is obtained via the MO IS-801 session in step i. The gpsOne API returns the position estimate to MS-resident application 112 in step j.

Figure 16:
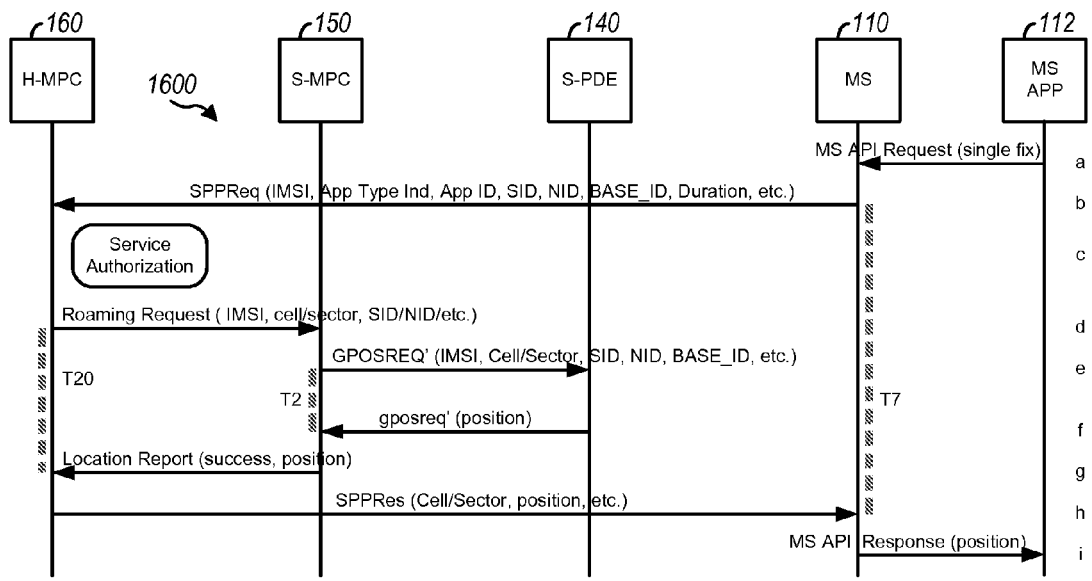

FIG. 16 shows a message flow 1600 for MS-resident single fix with cell/sector positioning. MS-resident application 112 invokes a gpsOne API to request a single fix with gpsOne positioning (step a). User notification and/or verification may occur prior to and/or after step a. Mobile station 110 then sends to H-MPC 160 an SPPReq message that may include information such as the application type, application ID, session duration (set to 0 for single fix), IMSI, SID/NID, etc. (step b). H-MPC 160 may verify that positioning is allowed for this user/application combination (step c). H-MPC 160 may also check to see if gpsOne position is needed and, in this case, determine that cell/sector-based position is appropriate.

H-MPC 160 determines that mobile station 110 is roaming and selects S-MPC 150 based on the SID/NID information. H-MPC 160 then sends to S-MPC 150 a Roaming Request message that may include information such as the IMSI, SID/NID, cell/sector positioning type, etc. (step d). S-MPC 150 receives the Roaming Request message with instructions to do cell/sector positioning and sends a GPOSREQ' message to S-PDE 140 (step e). S-PDE 140 returns a cell/sector-based position estimate of mobile station 110 in a gposreq' message to S-MPC 150 (step f). S-MPC 150 forwards the position estimate in a Location Report message to H-MPC 160 (step g). H-MPC 160 then sends the position estimate in an SPPRes message to mobile station 110 (step h). The gpsOne API then returns the position estimate to MS-resident application 112 (step i).

Figure 17:
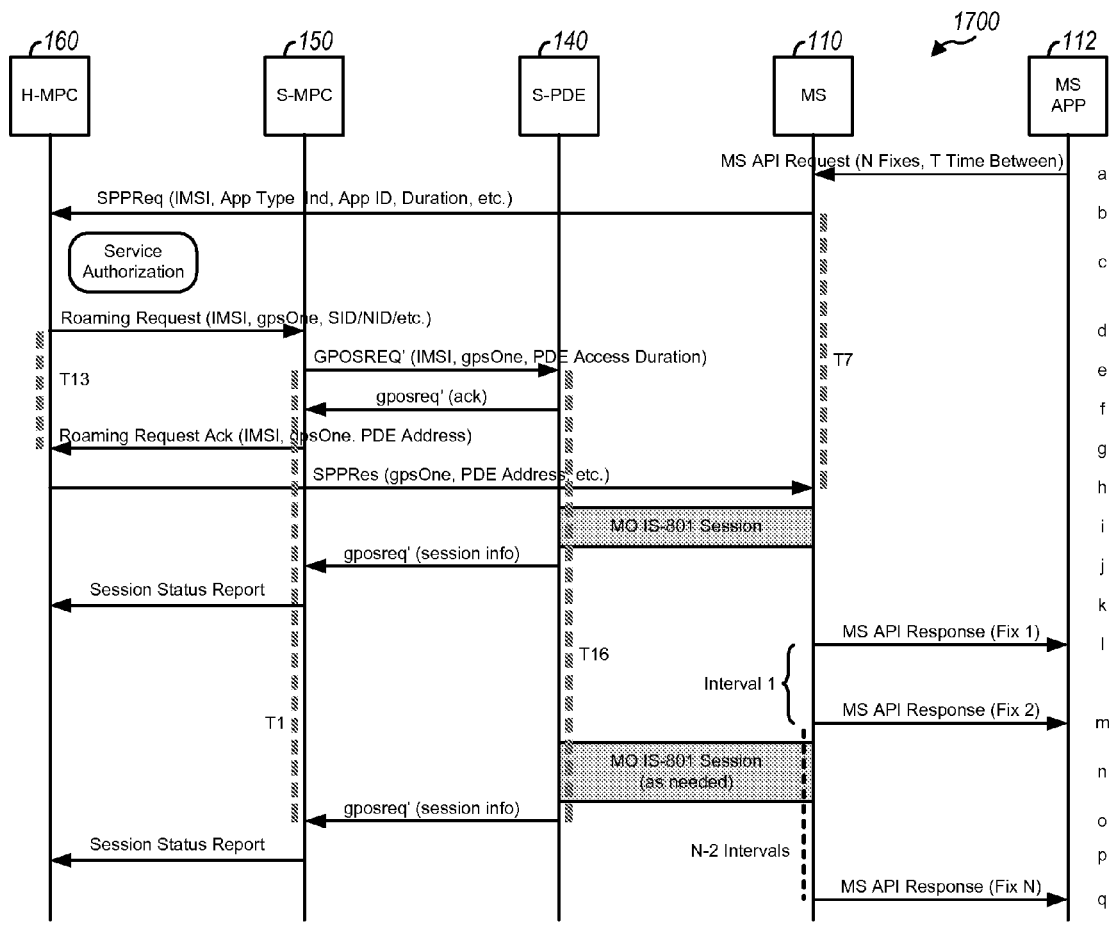

FIG. 17 shows a message flow 1700 for MS-resident tracking fix with gpsOne positioning. MS-resident application 112 invokes a gpsOne API to request tracking fix with gpsOne positioning (step a). User notification and/or verification may occur prior to and/or after step a. The request may include the number of fixes (N), the time interval (T) between fixes, etc. Mobile station 110 then sends to H-MPC 160 an SPPReq message that may include information such as the application type, application ID, session duration (determined based on N and T), IMSI, SID/NID, etc. (step b). H-MPC 160 may verify that location is allowed for this user/application combination (step c). H-MPC 160 may determine that gpsOne positioning is appropriate in this case. Steps d through g of message flow 1700 are the same as steps e through h, respectively, of message flow 900 in FIG. 9.

H-MPC 160 sends to mobile station 110 an SPPRes message instructing mobile station 110 to perform an IS-801 session and including the address of S-PDE 140 (step h). Mobile station 110 and S-PDE 140 perform an MO IS-801 session and a position estimate is made available to mobile station 110 at the end of the IS-801 session (step i). The IS-801 session may be skipped if MS-based positioning is used and mobile station 110 has current ephemeris information for GPS satellites. S-PDE 140 then informs S-MPC 150 that the IS-801 session terminated normally (step j). S-MPC

150 may return a Session Status Report message to the H-MPC to report the status of the IS-801 session (step k).

The gpsOne API returns the position estimate as the first fix to MS-resident application 112 (step l). After interval T, the gpsOne API returns the second fix to MS-resident application 112 (step m). Mobile station 110 and S-PDE 140 may perform additional MO IS-801 sessions, whenever needed, until the last fix is completed (step n). A position estimate may be made available to mobile station 110 at the end of each IS-801 session. After each additional MO IS-801 session, S-PDE 140 may inform S-MPC 150 that the IS-801 session terminated normally (step o), and S-MPC may return a Session Status Report message to H-MPC 160 to report the status of the IS-801 session (step p). The gpsOne API returns a position estimate for the last fix to MS-resident application 112 (step q).

Figure 18:
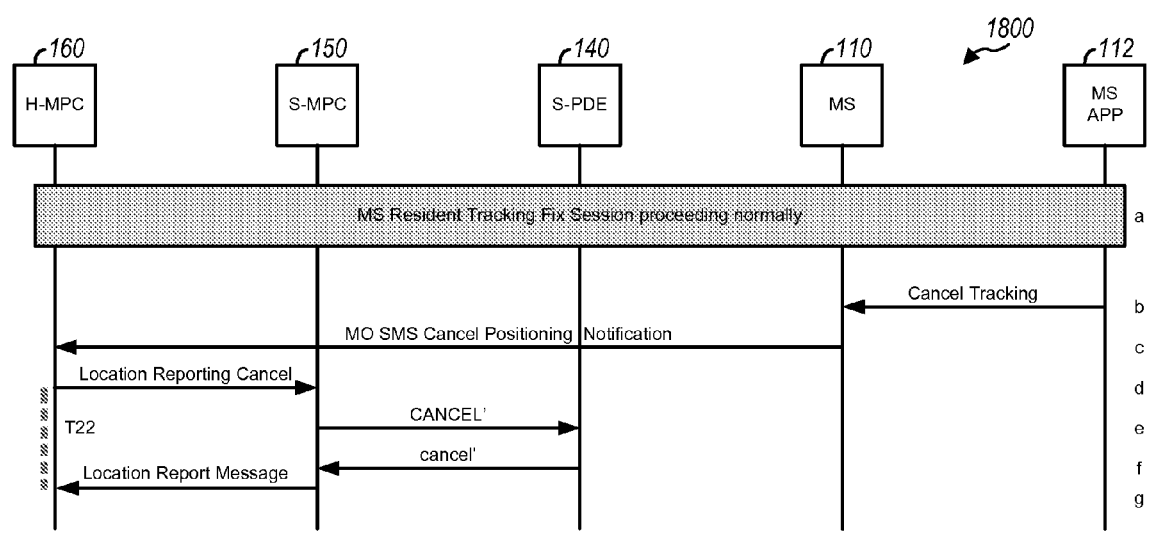

FIG. 18 shows a message flow 1800 for canceling an MS-resident tracking session by mobile station 110. An MS-resident tracking session for mobile station 110 may be started as shown in FIG. 17 and may proceed normally (step a). At any time during the tracking session, MS-resident application 112 may request cancellation of the tracking session (step b). Mobile station 110 may then send to H-MPC 160 an MO SMS Cancel Positioning Notification message to cancel the tracking session (step c). Steps d through g of message flow 1700 are the same as steps d through g, respectively, of message flow 1000 in FIG. 10.

Mobile station 110 may have a pending MS-resident tracking session and may roam outside the coverage of the current S-MPC 150 and S-PDE 140. Upon detecting IS-801 session failure due to PDE handoff error condition, H-MPC 160 may send an MT SMS message to refresh the MS-resident tracking session. Upon receiving this MT SMS message, mobile station 110 may send a new SPPReq message to H-MPC 160 for updated information on a new S-PDE and may then continue the tracking fix via the new S-PDE.

Figure 19:
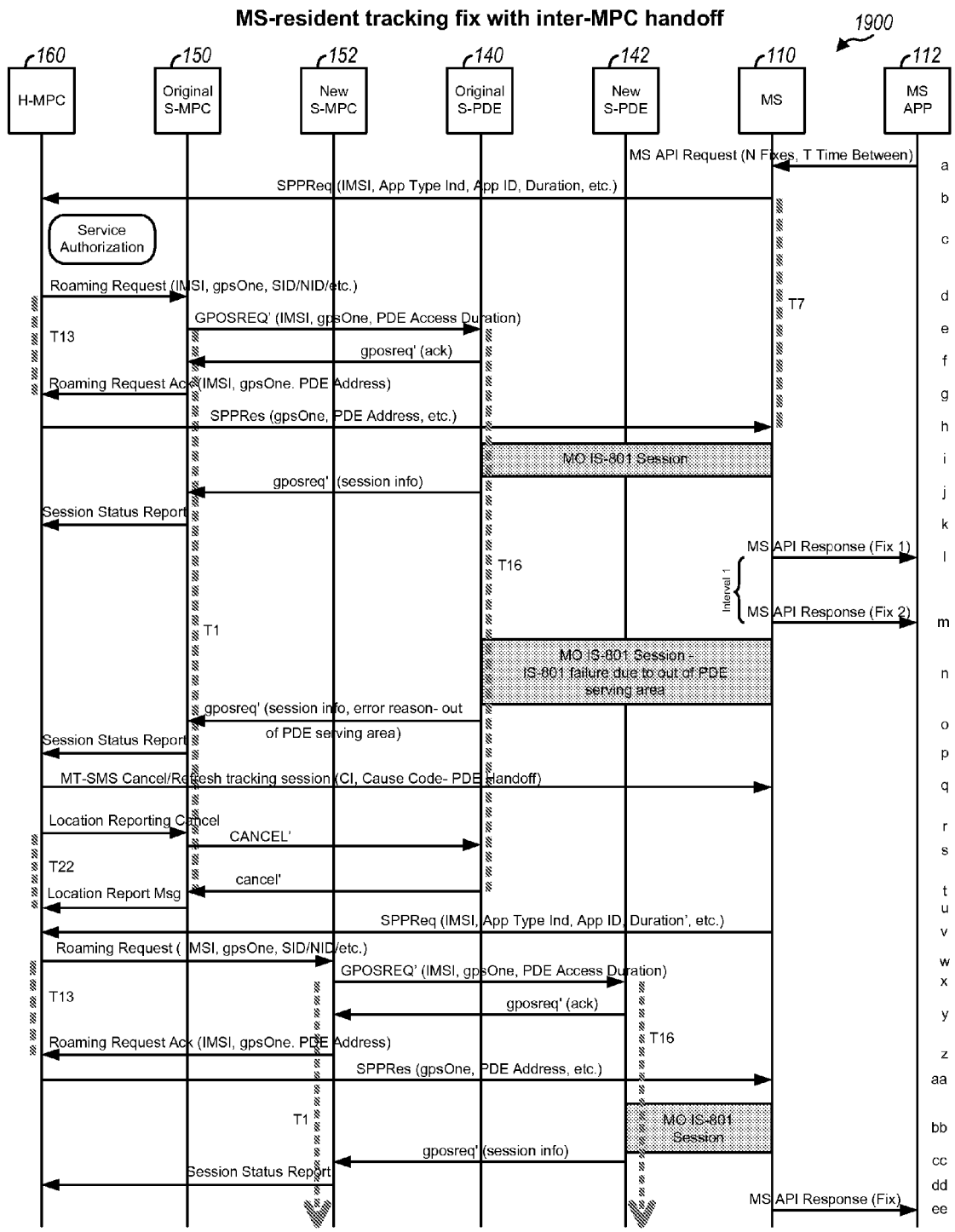

FIG. 19 shows a message flow 1900 for MS-resident tracking fix with inter-MPC handoff. Steps a through k of message flow 1900 are for initiation of the tracking session and are the same as steps a through k, respectively, of message flow 1700 in FIG. 17. Steps l and m of message flow 1900 are for the first two position fixes and are the same as steps l and m of message flow 1700.

At a later time, mobile station 110 and S-PDE 140 perform another MO IS-801 session that fails because mobile station 110 is outside the serving area of S-PDE 140 (step n). S-PDE 140 then informs S-MPC 150 of the IS-801 session failure by sending a gposreq' message with an error reason set to "S-PDE out of serving area" (step o). S-MPC 150 then reports the status of the IS-801 session to H-MPC 160 via a Session Status Report message that contains the IS-801 session information and the error reason indicated by S-PDE 140 (step p). H-MPC 160 detects that a PDE handoff is required and sends to mobile station 110 an MT SMS message with a cause code set to "PDE out of serving area" (step q). H-MPC 160 also cancels the tracking session with S-MPC 150 and S-PDE 140 via steps r through u, which are the same as steps d through g, respectively, of message flow 1000 in FIG. 10.

Mobile station 110 receives the MT SMS message and sends to H-MPC 160 an SPPReq message with information (e.g., IMSI, SID/NID, remaining duration, etc.) used for the remaining tracking session (step v). H-MPC uses the SID/NID information in the SPPReq message to determine that mobile station 110 is roaming and to select a new S-MPC, which in this example is S-MPC 152. H-MPC 160 then sends to S-MPC 152 a Roaming Request message with information (e.g., remaining session duration, etc.) used by S-MPC 152 to support the remaining tracking session with gpsOne positioning (step w). S-MPC 152 receives the Roaming Request message with instructions to do gpsOne positioning and sends to a new S-PDE (which in this example is S-PDE 142) a GPOS-REQ' message that invokes and seeds S-PDE 142 for the tracking session (step x). S-PDE 142 returns a gposreq' message containing an acknowledgment (step y). S-MPC 152 receives the gposreq' message and sends to H-MPC 160 a Roaming Request Acknowledgment message with the address of S-PDE 142 (step z).

After receiving the Acknowledgment message, H-MPC 160 sends an SPPRes message instructing mobile station 110 to perform an IS-801 session and including the address of S-PDE 142 (step aa). Mobile station 110 and S-PDE 142 perform an MO IS-801 session (block bb). After completing the IS-801 session, S-PDE 142 informs S-MPC 152 that the IS-801 session terminated normally (step cc). S-MPC 152 may return a Session Status Report message to H-MPC 160 to report the status of the IS-801 session (step dd). For each subsequent fix, the gpsOne API returns a current position estimate to MS-resident application 112 (step ee). The remaining tracking session may proceed in the normal manner as described for message flow 1700, albeit with new S-MPC 152 and new S-PDE 142.

Mobile station 110 may have a pending MS-resident tracking session and may roam outside the coverage of the current S-PDE 140 but may remain within the coverage of the current S-MPC 150. H-MPC 160 may send an MT SMS message to refresh the MS-resident tracking session, and mobile station 110 may send a new SPPReq message for updated information on a new S-PDE.

Figure 20:
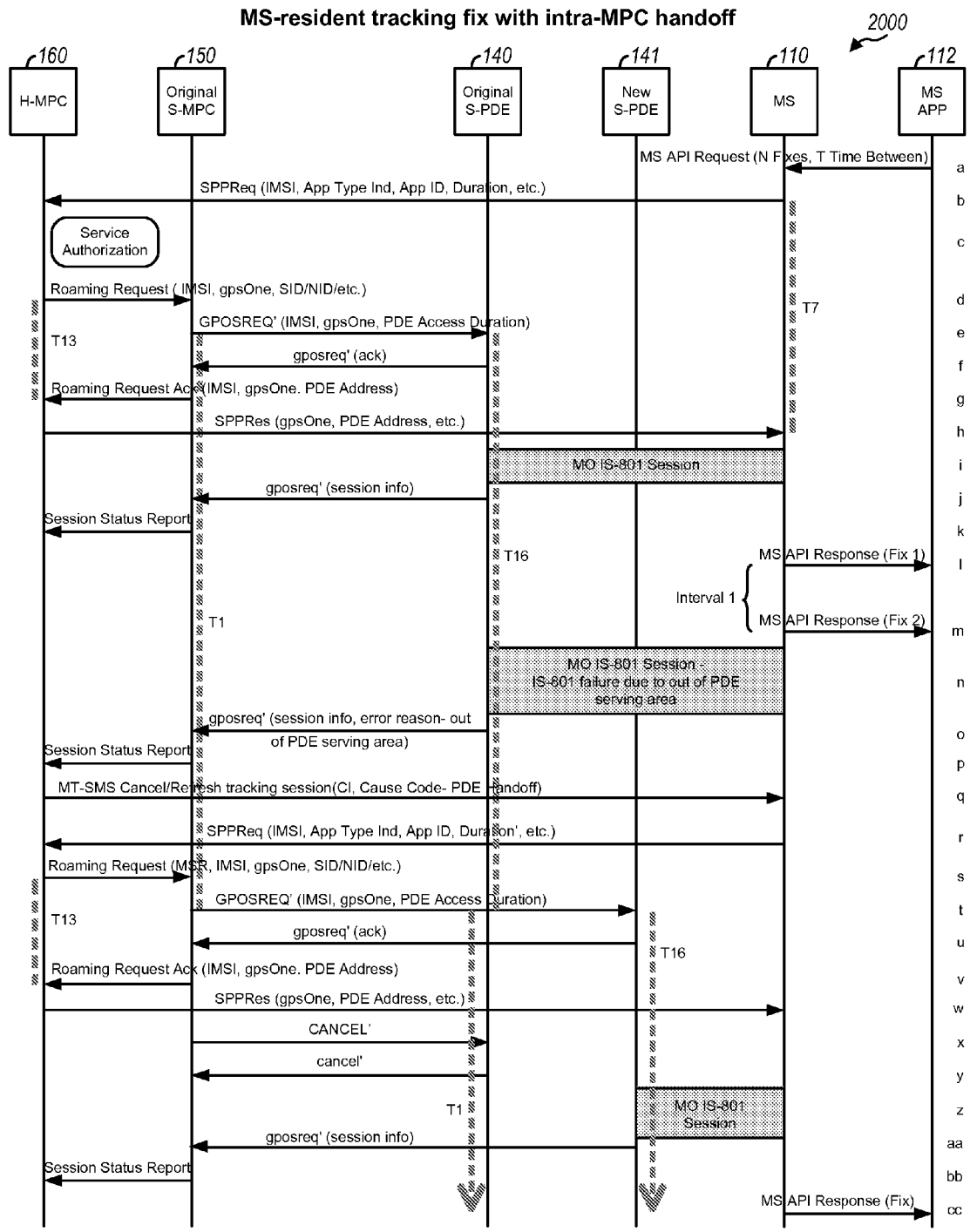

FIG. 20 shows a message flow 2000 for MS-resident tracking fix with intra-MPC handoff. Steps a through m of message flow 2000 are the same as steps a through m, respectively, of message flow 1700 in FIG. 17. Steps n through q of message flow 2000 are the same as steps n through q of message flow 1900 in FIG. 19.

Mobile station 110 receives an MT SMS message in step q and sends to H-MPC 160 an SPPReq message with information (e.g., IMSI, SID/NID, remaining duration, etc.) used for the remaining tracking session (step r). H-MPC uses the SID/NID information in the SPPReq message to determine that mobile station 110 is roaming and to select S-MPC 150. H-MPC 160 then sends to S-MPC 150 a Roaming Request message with information (e.g., remaining session duration, etc.) used by S-MPC 150 to support the remaining tracking session with gpsOne positioning (step s). S-MPC 150 receives the Roaming Request message with instructions to do gpsOne positioning and sends to a new S-PDE (which in this example is S-PDE 141) a GPOSREQ' message that invokes and seeds S-PDE 141 for the remaining tracking session (step t). S-PDE 141 returns a gposreq' message containing an acknowledgment (step u). S-MPC 150 receives the gposreq' message and sends to H-MPC 160 a Roaming Request Acknowledgment message with the address of S-PDE 141 (step v).

After receiving the Acknowledgment message, H-MPC 160 sends an SPPRes message instructing mobile station 110 to perform an IS-801 session and including the address of S-PDE 141 (step w). S-MPC 150 sends a CANCEL' message to release the tracking session with the previous S-PDE 140 (step x), which returns a cancel' message to S-MPC 150 (step y). Steps z through cc of message flow 2000 are the same as steps bb through ee of message flow 1900 in FIG. 19. The remaining tracking session may proceed in the normal manner, albeit with new S-PDE 141.

Figure 21:
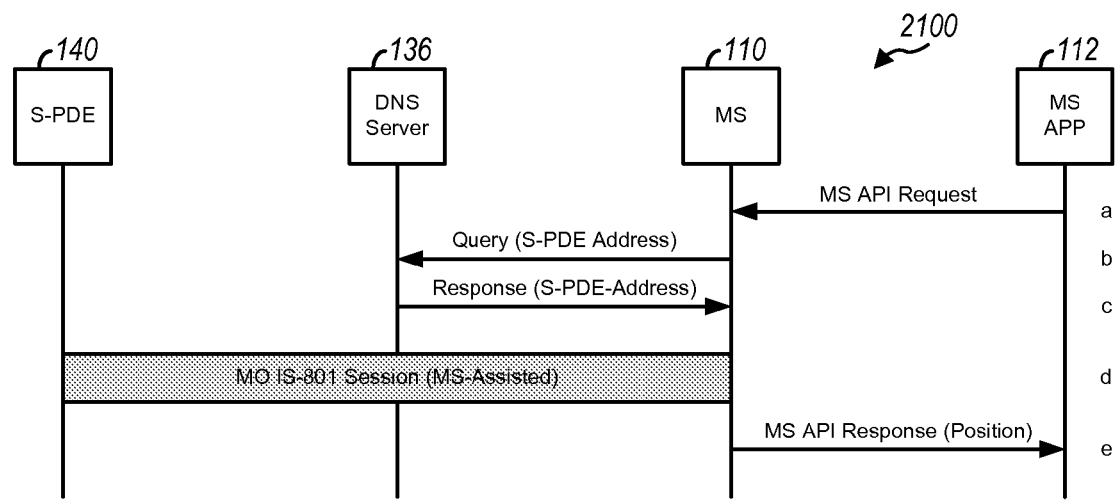

FIG. 21 shows a message flow 2100 for MS-resident single fix with gpsOne positioning. MS-resident application 112 invokes a gpsOne API to request a single fix with gpsOne positioning (step a). User notification and/or verification may occur prior to and/or after step a. Mobile station 110 recognizes that it is roaming and sends a query to DNS server 136 for the address of an S-PDE (step b). DNS server 136 responds with the address of S-PDE 140 (step c). Mobile station 110 and S-PDE 140 then perform an MO IS-801 session, and a position estimate is made available to mobile station 110 at the end of the IS-801 session (step d). The gpsOne API returns the position estimate to MS-resident application 112 (step e).

Message flows 300 through 2100 show various timers T1 through T22 that may be used for different transactions or message pairs. Each timer is shown by a heavy dashed line from the point/event where the timer is started to the point/event where the timer is stopped. Appropriate action (e.g., retry action, terminate action, clear resources, send notification, etc.) may be taken if a response or acknowledgement is not received by the time the timer expires. Any suitable duration may be used for each timer.

Home network 104 may support V1 user plane location, and visited network 102 may support V2 user plane location. The following message flows cover the case in which mobile station 110 roams from home network 104 with V1 user plane location to visited network 102 with V2 user plane location. In these message flows, H-MPC 160 and S-MPC 150 may use V1 MPC-MPC interface, and S-MPC 150 and S-PDE 140 within visited network 102 may use V2 E5' interface.

Figure 22:
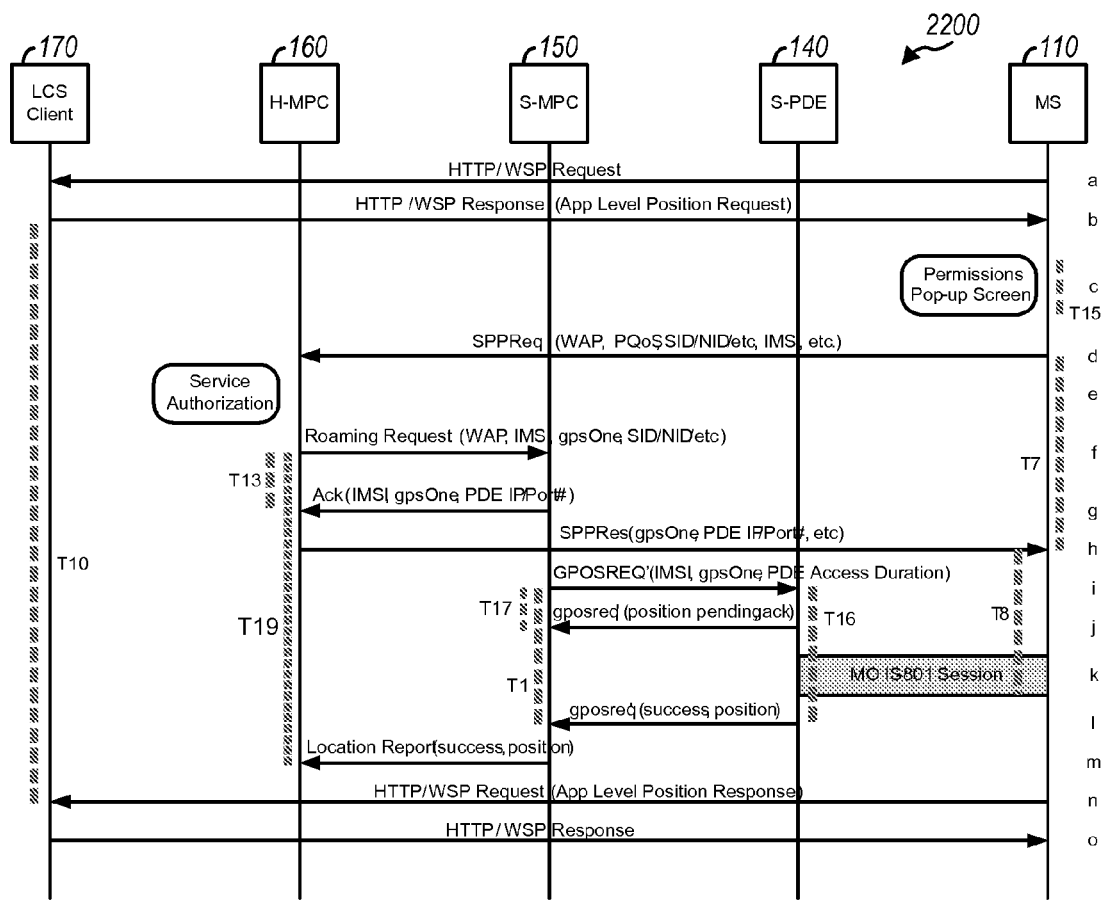

FIG. 22 shows a message flow 2200 for WAP pull single fix with gpsOne positioning. Steps a through e of message flow 2200 are the same as steps a through d of message flow 300 in FIG. 3. H-MPC 160 sends to S-MPC 150 a Roaming Request message containing the WAP application type, IMSI, gpsOne positioning type, SID/NID, PDE access duration, etc. (step f). S-MPC 150 receives the Roaming Request message and responds with a Roaming Request Acknowledgement message indicating that S-MPC 150 is able to accept the request and including the address and port number of S-PDE 140 (step g). H-MPC 160 sends an SPPRes message instructing mobile station 110 to perform an IS-801 session and including the address and port number of S-PDE 140 (step h).

S-MPC 150 sends a GPOSREQ' message that invokes and seeds S-PDE 140 and may include information such as the IMSI, gpsOne positioning type, PDE access duration, etc. (step i). S-PDE 140 returns a gposreq' message to acknowledge the GPOSREQ' message (step j). Mobile station 110 and S-PDE 140 perform an MO IS-801 session, and a position estimate of mobile station 110 is obtained and made available to the mobile station at the end of the IS-801 session (step k). S-PDE 140 then sends to S-MPC 150 a gposreq' message indicating that the IS-801 session terminated normally and including the position estimate (step l). S-MPC 150 sends the position estimate in a Location Report message to H-MPC 160, which may store the position estimate for later use (step m). Steps n and o are the same as steps m and n, respectively, of message flow 300.

Figure 23:
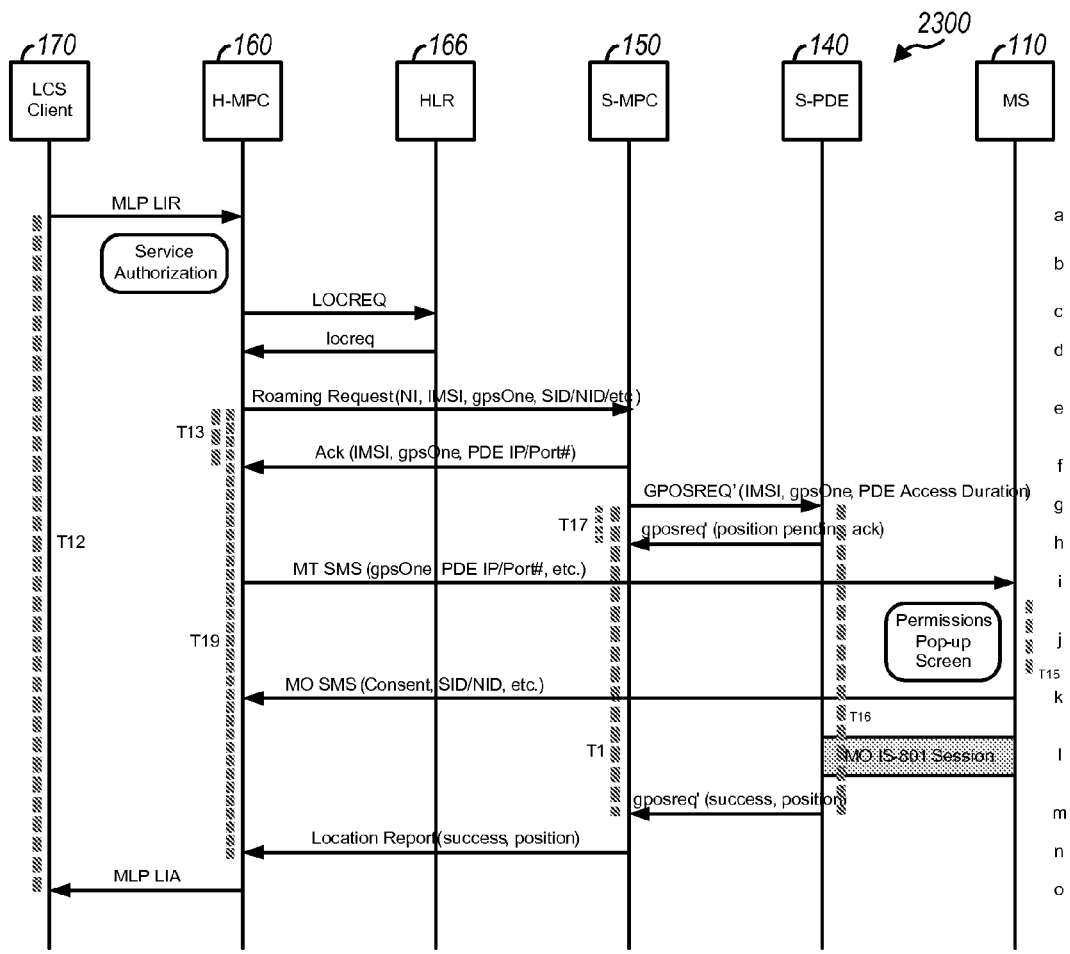

FIG. 23 shows a message flow 2300 for network-initiated single fix with gpsOne positioning. LCS client 170 requests the location of mobile station 110 from H-MPC 160 via an MLP LIR message (step a). H-MPC 160 may verify that LCS client 170 is authorized to obtain the location of the user (step b). H-MPC 160 may also check to see if gpsOne position is appropriate. If the request is authorized, then H-MPC 160 sends a Location Request (LOCREQ) message to HLR 166 to determine the current network location of mobile station 110 (step c). HLR 166 responds by sending the current network location in a locreq message to H-MPC 160 (step d). H-MPC 160 receives the locreq message and checks the current serving MSC ID (MSCID) of mobile station 110 to determine if the mobile station is within the serving area of H-MPC 160. In this case, mobile station 110 is outside the serving area of H-MPC 160. H-MPC 160 determines an S-MPC for mobile station 110 (which in this example is S-MPC 150) based on the MSCID. H-MPC 160 then sends to S-MPC 150 a Roaming Request message indicating gpsOne positioning (step e). S-MPC 150 receives the Roaming Request message and sends an Roaming Request Acknowledgement indicating that it is able to accept the request and including an address and port number for S-PDE 140 (step f). S-MPC 150 sends a GPOSREQ' message that invokes and seeds S-PDE 140 and includes information such as the PDE access duration (step g). S-PDE 140 returns a gposreq' message with a position pending acknowledgment (step h).

H-MPC 160 sends to mobile station 110 an MT SMS message instructing mobile station 110 to perform an IS-801 session and including the address and port number of S-PDE 140 (step i). If verification is required, then the user is prompted for permission (step j). Mobile station 110 sends to H-MPC 160 an MO SMS message with information such as user consent or lack of consent, SID/NID, etc. (step k). Mobile station 110 and S-PDE 140 perform an MO IS-801 session (step l). S-PDE 140 then sends to S-MPC 150 a gposreq' message indicating that the IS-801 session terminated normally and including a position estimate of mobile station 110 (step m). S-MPC 160 forwards the position estimate in a Location Report message to H-MPC 160 (step n). H-MPC 160 provides the position estimate to LCS client 170 (step o).

Figure 24:
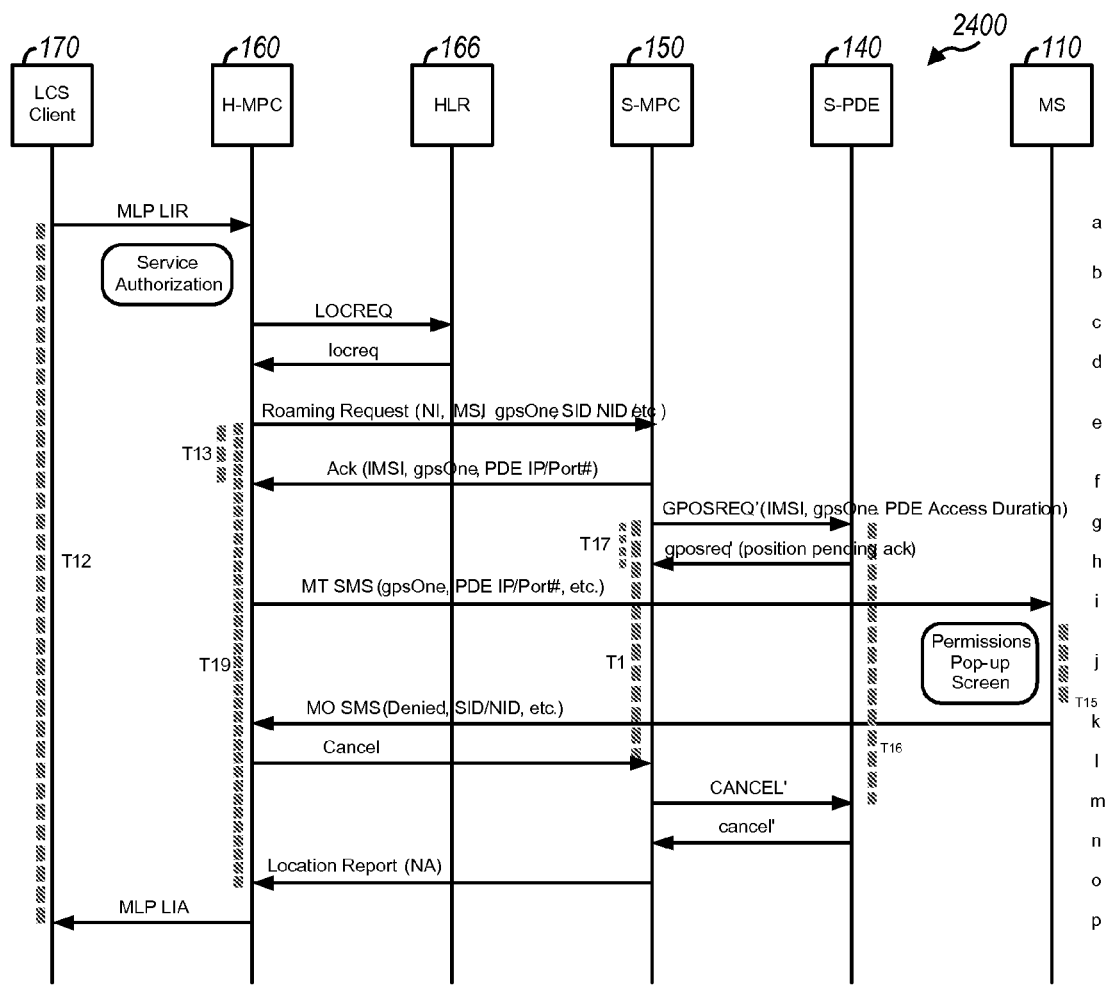

FIG. 24 shows a message flow 2400 for network-initiated single fix with mobile station 110 denying gpsOne positioning request. Steps a through j of message flow 2400 are the same as steps a through j of message flow 2300 in FIG. 23. In this case, user consent is not obtained in step j. Mobile station 110 then sends to H-MPC 160 an MO SMS message with a Consent Indicator set to "user denied request" (step k). H-MPC 160 sends a Cancel message to S-MPC 150 (step l). S-MPC 150 sends a CANCEL' message to S-PDE 140 (step m), which responds with a cancel' message (step n). S-MPC 150 then sends to H-MPC 160 a Location Report message with position result set to "Not Applicable" (step o). H-MPC 160 provides the position status to LCS client 170 (step p).

Figure 25:
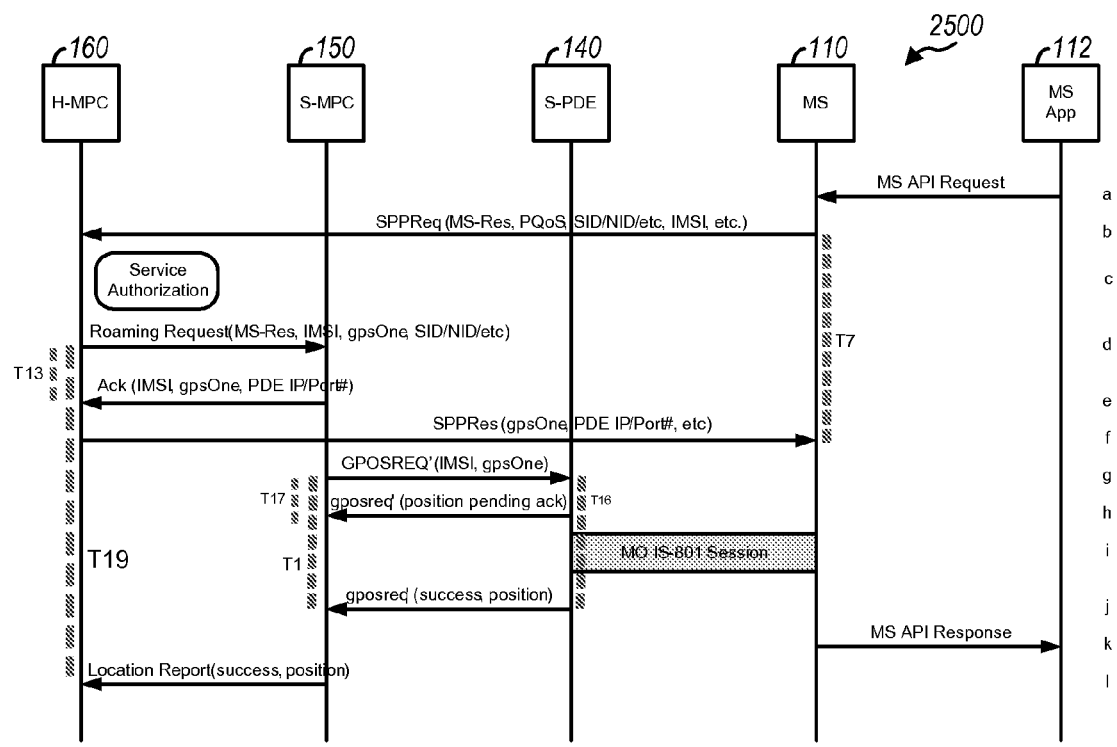

FIG. 25 shows a message flow 2500 for MS-resident single fix with gpsOne positioning. MS-resident application 112 invokes a gpsOne API to request a single fix with gpsOne positioning (step a). User notification and/or verification may occur prior to and/or after step a. Mobile station 110 then sends to H-MPC 160 an SPPreq message that may include information such as the application type, QoS, SID/NID, IMSI, etc. (step b). H-MPC 160 may perform authorization to ensure that this particular user can access to the location application being requested (step c). H-MPC 160 may also check to see that gpsOne positioning is appropriate.

If an IS-801 session is appropriate, then H-MPC 160 checks the SID/NID information to determine if mobile station 110 is within the serving area of H-MPC 160. In this case, mobile station 110 is outside the serving area of H-MPC 160. H-MPC 160 selects S-MPC 150 based on the SID/NID information and sends a Roaming Request message to S-MPC 150 (step d). S-MPC 150 receives the Roaming Request message and sends a Roaming Request Acknowledgement message indicating that S-MPC 150 is able to accept the request and including an address and port number of S-PDE 140 (step e).

H-MPC 160 sends to mobile station 110 an SPPRes message instructing mobile station 110 to perform an IS-801 session and including the address and port number of S-PDE 140 (step f). S-MPC 150 sends a GPOSREQ' message that invokes and seeds S-PDE 140 (step g), which returns a gposreq' message to acknowledge the GPOSREQ' message (step h).

Mobile station 110 and S-PDE 140 perform an MO IS-801 session, and a position estimate is made available to mobile station 110 at the end of the IS-801 session (step i). S-PDE 140 sends to S-MPC 150 a gposreq' message indicating that the IS-801 session terminated normally and including the position estimate (step j). The gpsOne API returns the position estimate to MS-resident application 112 (step k). S-MPC 150 sends the position estimate in a Location Report message to H-MPC 160 (step l).

Figure 26:
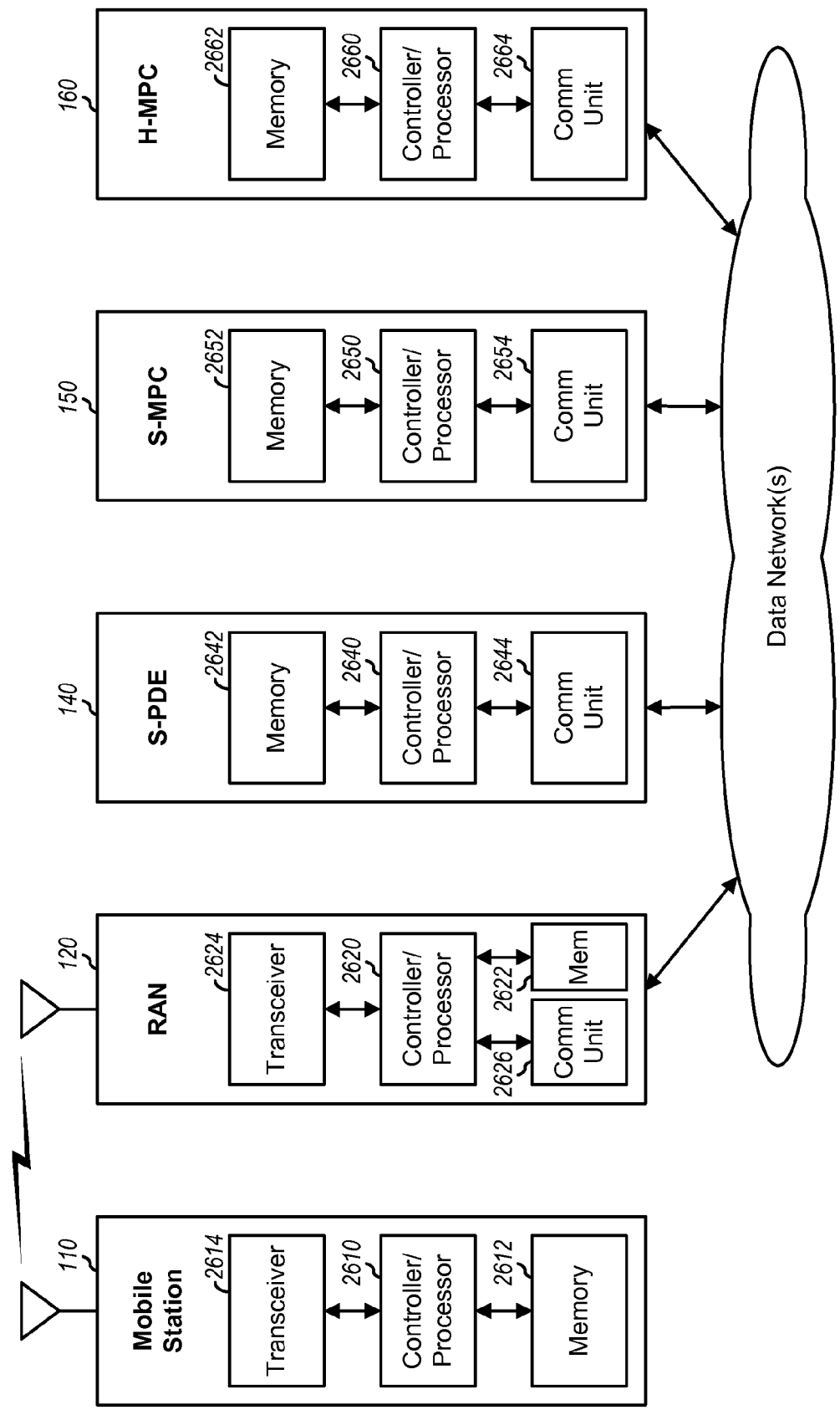
FIG. 26 shows a block diagram of a mobile station, a radio access network (RAN), an S-PDE, an S-MPC, and an H-MPC.

FIG. 26 shows a block diagram of mobile station 110, RAN 120, S-PDE 140, S-MPC 150, and H-MPC 160. For simplicity, FIG. 26 shows (a) one controller/processor 2610, one memory 2612, and one transceiver 2614 for mobile station 110, (b) one controller/processor 2620, one memory 2622, one transceiver 2624, and one communication (Comm) unit 2626 for RAN 120, (c) one controller/processor 2640, one memory 2642, and one communication unit 2644 for S-PDE 140, (d) one controller/processor 2650, one memory 2652, and one communication unit 2654 for S-MPC 150, and (e) one controller/processor 2660, one memory 2662, and one communication unit 2664 for H-MPC 160. In general, each entity may include any number of controllers, processors, memories, transceivers, communication units, etc.

On the downlink, base stations in RAN 120 transmit traffic data, messages/signaling, and pilot to mobile stations within their coverage area. These various types of data are processed by processor 2620 and conditioned by transceiver 2624 to generate a downlink signal, which is transmitted via an antenna. At mobile station 110, the downlink signals from base stations are received via an antenna, conditioned by transceiver 2614, and processed by processor 2610 to obtain various types of information for positioning, location and other services. For example, processor 2610 may decode messages used for the message flows described above. Memories 2612 and 2622 store program codes and data for mobile station 110 and RAN 120, respectively. On the uplink, mobile station 110 may transmit traffic data, messages/signaling, and pilot to base stations in RAN 120. These various types of data are processed by processor 2610 and conditioned by transceiver 2614 to generate an uplink signal, which is transmitted via the mobile station antenna. At RAN 120, the uplink signals from mobile station 110 and other mobile stations are received and conditioned by transceiver 2624 and further processed by processor 2620 to obtain various types of information, e.g., data, messages/signaling, etc. RAN 120 may communicate with other network entities via communication unit 2626.

Within S-PDE 140, processor 2640 performs processing for the S-PDE, memory 2642 stores program codes and data for the S-PDE, and communication unit 2644 allows the S-PDE to communicate with other entities. Processor 2640 may perform processing for S-PDE 140 in the message flows described above.

Within S-MPC 150, processor 2650 performs location and/or positioning processing for the S-MPC, memory 2652 stores program codes and data for the S-MPC, and communication unit 2654 allows the S-MPC to communicate with other entities. Processor 2650 may perform processing for S-MPC 150 in the message flows described above.

Within H-MPC 150, processor 2660 performs location and/or positioning processing for the H-MPC, memory 2662 stores program codes and data for the H-MPC, and communication unit 2664 allows the H-MPC to communicate with other entities. Processor 2660 may perform processing for H-MPC 160 in the message flows described above.

The techniques described herein may be implemented by various means. For example, these techniques may be implemented in hardware, firmware, software, or a combination thereof. For a hardware implementation, the processing units used to perform the techniques at each entity (e.g., mobile station 110, S-PDE 140, S-MPC 150, H-MPC 160, etc.) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, and so on) that perform the functions described herein. The firmware and/or software codes may be stored in a memory (e.g., memory 2612, 2642, 2652 or 2662 in FIG. 26) and executed by a processor (e.g., processor 2610, 2640, 2650 or 2660). The memory may be implemented within the processor or external to the processor. For example, according to some embodiments, a processor readable media for storing instructions is operable to: receive a location request for location of a mobile station at a home mobile positioning center (H-MPC) in a home network; receive first information from the mobile station; determine a serving mobile positioning center (S-MPC) in a visited network based on the first information; receive second information from the S-MPC; and send the second information to the mobile station. In some embodiments, the processor readable media is further for storing instructions operable to: receive a system identifier (SID) and a network identifier (NID) from the mobile station; determine the S-MPC based on the SID and receive an address of a serving position determining entity (S-PDE) from the S-MPC; and send the address of the S-PDE to the mobile station.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus supporting location services (LCS) for a mobile station roaming from a home network and communicating with a visited network, the apparatus comprising:
   at least one processor to:
      receive a location request for a location of the mobile station at a home mobile positioning center (H-MPC) in the home network, wherein the location request is received from an entity;
      determine that the entity is authorized to obtain the location of the mobile station before the location of the mobile station is determined;
      receive first information from the mobile station, wherein the first information comprises an indication of a current network location of the mobile station;

determine a serving mobile positioning center (S-MPC) in the visited network based on the indication of the current network location of the mobile station;

request a location of the mobile station from the S-MPC;

receive second information comprising the location of the mobile station from the S-MPC; and send the location of the mobile station received from the S-MPC to the entity as the location of the mobile station when the entity is authorized to receive the location of the mobile station; and a memory coupled to the at least one processor.

2. The apparatus of claim 1, wherein the at least one processor is further to:

determine that the mobile station is roaming outside a coverage of the H-MPC based on the first information; and select the S-MPC that covers the current network location of the mobile station.

3. The apparatus of claim 1, wherein the indication of the current network location of the mobile station comprises a system identifier (SID) and a network identifier (NID).

4. The apparatus of claim 1, wherein the indication of the current network location of the mobile station comprises at least one of a mobile country code (MCC), a mobile network code (MNC), a location area code (LAC), a cell identity (CI), and a UTRAN cell identity (UC-ID).

5. The apparatus of claim 1, wherein the indication of the current network location of the mobile station comprises an identification of an access point.

6. The apparatus of claim 1, wherein the at least one processor is further to send the location of the mobile station from the S-MPC to an entity originating the location request.

7. The apparatus of claim 1, wherein the entity comprises one of an LCS client and the mobile station.

8. The apparatus of claim 1, wherein the at least one processor is further to:

receive the location request from an LCS client;

send a positioning request to the mobile station; and receive the first information from the mobile station in response to the positioning request.

9. The apparatus of claim 1, wherein the at least one processor is further to send the location of the mobile station from the S-MPC to an LCS client.

10. The apparatus of claim 1, wherein the location request comprises the first information.

11. The apparatus of claim 1, wherein the location request comprises a location request for a plurality of position fixes for the mobile station.

12. The apparatus of claim 11, wherein the at least one processor is further to:

receive the location request from an LCS client;

for each of the plurality of position fixes, obtain a position estimate of the mobile station; and send the position estimate to the LCS client.

13. The apparatus of claim 11, wherein the at least one processor is further to:

receive from the LCS client an indication to cancel reporting of the location of the mobile station; and send notification to the mobile station to cancel location reporting.

14. The apparatus of claim 11, wherein the at least one processor is further to:

receive from the mobile station an indication to cancel reporting of the location of the mobile station; and send notification to the LCS client.

15. The apparatus of claim 11, wherein the at least one processor is further to receive the location request from the mobile station.

16. The apparatus of claim 11, wherein the at least one processor is further to:

receive a second indication of a second current network location of the mobile station, wherein the second current network location of the mobile station is outside a serving area of the S-MPC; and request a second location based on the second indication of the second current network location of the mobile station from a second S-MPC.

17. The apparatus of claim 1, wherein the indication of the current network location of the MS comprises a sector identifier (SectorID).

18. An apparatus supporting location services (LCS) for a mobile station roaming from a home network and communicating with a visited network, the apparatus comprising:

means for receiving a location request for a location of the mobile station at a home mobile positioning center (H-MPC) in the home network, wherein the location request is received from an entity;

means for determining that the entity is authorized to obtain the location of the mobile station before the location of the mobile station is determined;

means for receiving first information from the mobile station, wherein the first information comprises an indication of a current network location of the mobile station;

means for determining a serving mobile positioning center (S-MPC) in the visited network based on the indication of the current network location of the mobile station;

means for requesting a location of the mobile station from the S-MPC;

means for receiving second information comprising the location of the mobile station from the S-MPC; and means for sending the location of the mobile station received from the S-MPC to the entity as the location of the mobile station when the entity is authorized to receive the location of the mobile station.

19. The apparatus of claim 18, wherein the indication of the current network location of the mobile station comprises a system identifier (SID) and a network identifier (NID).

20. The apparatus of claim 18, wherein the indication of the current network location of the mobile station comprises at least one of a mobile country code (MCC), a mobile network code (MNC), a location area code (LAC), a cell identity (CI), and a UTRAN cell identity (UC-ID).

21. The apparatus of claim 18, wherein the indication of the current network location of the mobile station comprises an identification of an access point.

22. The apparatus of claim 18, wherein the entity comprises one of an LCS client and the mobile station.

23. The apparatus of claim 18, wherein the location request comprises the first information.

24. The apparatus of claim 18, wherein the location request comprises a location request for a plurality of position fixes for the mobile station.

25. The apparatus of claim 18, wherein the indication of the current network location of the mobile station comprises a sector identifier (SectorID).

26. A non-transitory processor readable media for storing instructions operable to:

receive a location request for a location of a mobile station at a home mobile positioning center (H-MPC) in a home network, wherein the location request is received from an entity;

determine that the entity is authorized to obtain the location of the mobile station before the location of the mobile station is determined;
receive first information from the mobile station, wherein the first information comprises an indication of a current network location of the mobile station;
determine a serving mobile positioning center (S-MPC) in a visited network based on the indication of the current network location of the mobile station;
request a location of the mobile station from the S-MPC;
receive second information comprising the location of the mobile station from the S-MPC; and
send the location of the mobile station from the S-MPC to the entity as the location of the mobile station when the entity is authorized to receive the location of the mobile station.

27. The non-transitory processor readable media of claim 26, further comprising instructions to:
determine that the mobile station is roaming outside a coverage of the H-MPC based on the first information; and
select the S-MPC that covers the current network location of the mobile station.

28. The non-transitory processor readable media of claim 26, wherein the indication of the current network location of the mobile station comprises a system identifier (SID) and a network identifier (NID).

29. The non-transitory processor readable media of claim 26, wherein the indication of the current network location of the mobile station comprises at least one of a mobile country code (MCC), a mobile network code (MNC), a location area code (LAC), a cell identity (CI), and a UTRAN cell identity (UC-ID).

30. The non-transitory processor readable media of claim 26, wherein the indication of the current network location of the mobile station comprises an identification of an access point.

31. The non-transitory processor readable media of claim 26, further comprising instructions to send the location of the mobile station from the S-MPC to an entity originating the location request.

32. The non-transitory processor readable media of claim 26, wherein the entity comprises one of an LCS client and the mobile station.

33. The non-transitory processor readable media of claim 26, further comprising instructions to:
receive the location request from an LCS client;
send a positioning request to the mobile station; and
receive the first information from the mobile station in response to the positioning request.

34. The non-transitory processor readable media of claim 26, further comprising instructions to send the location of the mobile station from the S-MPC to an LCS client.

35. The non-transitory processor readable media of claim 26, wherein the location request comprises the first information.

36. The non-transitory processor readable media of claim 26, wherein the location request comprises a location request for a plurality of position fixes for the mobile station.

37. The non-transitory processor readable media of claim 36, further comprising instructions to:
receive the location request from an LCS client;
for each of the plurality of position fixes, obtain a position estimate of the mobile station; and
send the position estimate to the LCS client.

38. The non-transitory processor readable media of claim 36, further comprising instructions to:
receive from the LCS client an indication to cancel reporting of the location of the mobile station; and
send notification to the mobile station to cancel location reporting.

39. The non-transitory processor readable media of claim 36, further comprising instructions to:
receive from the mobile station an indication to cancel reporting of the location of the mobile station; and
send notification to the LCS client.

40. The non-transitory processor readable media of claim 36, wherein the at least one processor is further to receive the location request from the mobile station.

41. The non-transitory processor readable media of claim 36, further comprising instructions to:
receive a second indication of a second current network location of the mobile station,
wherein the second current network location of the mobile station is outside a serving area of the S-MPC; and
request a second location based on the second indication of the second current network location of the mobile station from a second S-MPC.

42. The non-transitory processor readable media of claim 26, wherein the indication of the current network location of the mobile station comprises a sector identifier (SectorID).

43. A method of supporting location services (LCS) in a network comprising a mobile station (MS), a home mobile positioning center (H-MPC), and a serving mobile positioning center (S-MPC), the method at the H-MPC comprising:
receiving, from a LCS client, a location request message for a location of the MS;
determining that the LCS client is authorized to obtain the location of the MS before the location of the MS is determined;
sending, to the MS, a positioning request message;
receiving, from the MS and in response to the positioning request message, a message comprising an indication of a current network location of the MS;
sending, to the S-MPC, a roaming request message comprising the indication of the current network location of the MS;
receiving, from the S-MPC in response to the roaming request message, a location report message comprising a position of the current network location of the MS; and
sending, to the LCS client, a reporting message comprising the position of the current network location of the MS as the location of the MS when the LCS client is authorized to receive the location of the mobile station.

44. The method of claim 43, wherein the location request message triggers a network-initiated tracking fix with cell/sector positioning.

45. The method of claim 43, wherein the positioning request message comprises a mobile terminated short message services (MT SMS) message.

46. The method of claim 45, wherein the MT SMS message comprises an indication of a number of fixes (N) and a time interval between fixes (T).

47. The method of claim 43, further comprising:
receiving, from the MS and in response to the positioning request message, a second message comprising a second indication of a second current network location of the MS;
sending, to the S-MPC, a second roaming request messaging comprising the second indication of the second current network location;

receiving, from the S-MPC and in response to the second roaming request message, a second location report message comprising a second position of the second current network location based on the second indication of the second current network location; and sending, to the LCS client, a reporting message comprising the second position of the second current network location as a second location of the MS when the LCS client is authorized to receive the location of the mobile station.

48. The method of claim 43, wherein the H-MPC comprises a first SUPL Location Center (SLC) and the S-MPC comprises a second SUPL Location Center (SLC).

49. A method of supporting location services (LCS) in a network comprising a mobile station (MS), a home mobile positioning center (H-MPC), and a serving mobile positioning center (S-MPC), the method at the H-MPC comprising:

receiving, from an application resident on the MS, a location request message for a location of the MS, wherein the location request message comprises an indication of a current network location of the MS;

determining that the application resident on the MS is authorized to obtain the location of the MS before the location of the MS is determined;

sending, to the S-MPC in response to the location request message, a roaming request messaging;

receiving, from the S-MPC in response to the roaming request message, a location report message comprising a position of the current network location; and sending, to the application resident on the MS, a reporting message comprising the position of the current network location of the MS as the location of the MS when the application resident on the MS is authorized to obtain the location of the MS.

50. The method of claim 49, wherein the location request message comprises a message in response to a request for a single fix from the application resident on the MS.

51. The method of claim 49, wherein the H-MPC comprises a first SUPL Location Center (SLC) and the S-MPC comprises a second SUPL Location Center (SLC).

* * * * *